(12) United States Patent
Hill

(10) Patent No.: US 12,110,102 B2
(45) Date of Patent: Oct. 8, 2024

(54) MASS DISTRIBUTION METHOD AND APPARATUS

(71) Applicant: HILL GROUP TECHNOLOGIES LIMITED, Staffordshire (GB)

(72) Inventor: Jason Hill, Staffordshire (GB)

(73) Assignee: HILL GROUP TECHNOLOGIES LIMITED, Staffordshire (GB)

( * ) Notice: Subject to any disclaimer, the term of this patent is extended or adjusted under 35 U.S.C. 154(b) by 0 days.

(21) Appl. No.: 18/022,384

(22) PCT Filed: Aug. 23, 2021

(86) PCT No.: PCT/GB2021/052177
§ 371 (c)(1),
(2) Date: Feb. 21, 2023

(87) PCT Pub. No.: WO2022/038379
PCT Pub. Date: Feb. 24, 2022

(65) Prior Publication Data
US 2024/0025539 A1    Jan. 25, 2024

(30) Foreign Application Priority Data
Aug. 21, 2020  (GB) ..................................... 2013111

(51) Int. Cl.
*B64C 27/06*  (2006.01)
*B64C 17/00*  (2006.01)
(Continued)

(52) U.S. Cl.
CPC .............. *B64C 27/06* (2013.01); *B64C 17/00* (2013.01); *B64D 41/00* (2013.01);
(Continued)

(58) Field of Classification Search
CPC ......... B64C 27/06; B64C 17/00; B64C 17/10; B64C 27/04; B64D 41/00;
(Continued)

(56) References Cited

U.S. PATENT DOCUMENTS 9,205,913 B2    12/2015   Van Der Westhuizen
9,932,104 B2 *   4/2018   Behrens ................... B64D 1/22
(Continued)

FOREIGN PATENT DOCUMENTS

CN          110963018 A    4/2020
EP            3053823 A1    8/2016

OTHER PUBLICATIONS

PCT International Search Report and Written Opinion dated Dec. 7, 2021, PCT International Application No. PCT/GB2021/052177, pp. 1-14.

(Continued)

*Primary Examiner* — Valentina Xavier
(74) *Attorney, Agent, or Firm* — Resolute Legal PLLC

(57) ABSTRACT

Disclosed is a helicopter having a longitudinal axis, a lateral axis and a vertical axis, a helicopter centre of mass and a maximum gross mass of less than 5000 kg, the helicopter comprising a fuselage elongate along the longitudinal axis, the fuselage comprising an aerodynamically shaped shell defining a front, a rear, a top and a bottom of the fuselage and a passenger cabin therein having two forward-facing front seating positions for the pilot and a co-pilot or a passenger, and forward-facing rear seating positions for at least 2 passengers, optionally 3 passengers; a primary fuel cell mounted substantially behind the passenger cabin; the front seating position for the pilot having a centre of mass at a first location substantially in front of the rotor hub location, and the primary fuel cell having a centre of mass at a second location substantially behind the rotor hub location; a land- (Continued)

ing gear arrangement; a power plant mounted substantially above and behind the passenger cabin, wherein the primary fuel cell is arranged to provide fuel to the power plant; and a secondary fuel cell having a centre of mass at a nose location in front of the rotor hub location by at least 1500 mm.

18 Claims, 16 Drawing Sheets

(51) Int. Cl.
  *B64D 41/00* (2006.01)
  *H01M 8/04082* (2016.01)
  *H01M 8/04746* (2016.01)
(52) U.S. Cl.
  CPC ... *H01M 8/04201* (2013.01); *H01M 8/04753* (2013.01); *B64D 2041/005* (2013.01); *H01M 2250/20* (2013.01)

(58) Field of Classification Search
  CPC ............. B64D 2041/005; B64D 37/04; H01M 8/04201; H01M 8/04753; H01M 2250/20
  See application file for complete search history.

(56) References Cited

U.S. PATENT DOCUMENTS

| | | | |
|---|---|---|---|
| 11,623,758 B2* | 4/2023 | Terry | B64D 37/06 244/135 R |
| 2015/0102040 A1 | 4/2015 | Bornes | |
| 2017/0313434 A1* | 11/2017 | Peryea | B64D 37/32 |
| 2019/0023393 A1* | 1/2019 | Schwaiger | B64C 27/22 |

OTHER PUBLICATIONS

Combined Search and Examination Report under Sections 17 & 18(3) issued Apr. 8, 2021, GB Application No. 2013111.6, pp. 1-6.

\* cited by examiner

MASS DISTRIBUTION METHOD AND APPARATUS

CROSS REFERENCE TO RELATED APPLICATION

This application is a National Stage Application of International Application No. PCT/GB2021/052177 filed Aug. 23, 2021, which claims the benefit and priority of UK Patent Application No. 2013111.6, filed Aug. 21, 2020, the disclosures of which are incorporated by reference herein in their entirety as part of the present application.

It has been a long-established desire of researchers to make helicopters fly faster and further on an economical amount of fuel and much research and development has been poured into every aspect of helicopter design to try to achieve this. The cabin clearly has the major cross-sectional area; however, aerodynamic considerations for a helicopter are complicated by the fact that the airflow is substantially vertically downward in a hover and then transitions to having an increasing backward component over the body in forward flight, and a helicopter must remain stable in a low speed sideways or backwards hover whereas a fixed wing aircraft only has airflow from forward motion. Despite sustained research efforts, the best conventional helicopter designs cannot generally equal the speed and range of considerably less expensive piston powered light aircraft and so are less favoured unless vertical take-off and landing is essential and justifies the cost.

The primary way to improve the range, payload and/or speed of light helicopters is to reduce their empty mass. Due to fundamental design consideration differences between aircraft of different sizes, such as the importance of the weight of additional components, the performance of heavier helicopters is often improved instead with aerodynamic features and larger or more engines.

The operational usefulness of light helicopters is also often limited by maintaining the loaded aircraft's longitudinal centre of mass position within safe limits. Excessive displacement of the longitudinal centre of mass position will result in fuselage rotations relative the rotor that will eventually exceed the available range of longitudinal cyclic pitch to trim the aircraft for equilibrium.

Modern composite helicopters can achieve very high useful mass fractions, i.e. the fraction or percentage of the maximum take-off weight which is payload (fuel, passengers, and cargo). Unfortunately, as the useful mass fraction increases, so does the percentage of the total aircraft mass that is variable, either by mission or during a flight as the fuel is consumed. This inherently gives rise to the tendency for the centre of mass to move significantly further than can be tolerated.

Additional difficulties arise, when one seeks to put a spacious cabin on a relatively small helicopter—since compared to traditional helicopters this results in cabin seats having larger moment arms about the rotor mast, again giving rise to greater variation per loading case than traditional helicopters.

Still more difficulty arises when a long range fuel tank is required in order to provide the aircraft with the range necessary to carry out useful charter operations (3-5 hrs), particularly when the fuel tank is sized to hold sufficient fuel to run a turbine engine at a high cruise power setting.

It is noted that the terms centre of mass and centre of gravity, as well as CG, CoG, CM and CoM are used interchangeably herein.

According to one aspect, there is provided a helicopter having a longitudinal axis, a lateral axis and a vertical axis, a helicopter centre of mass and a maximum gross mass of less than 5000 kg, the helicopter comprising:

- a fuselage elongate along the longitudinal axis, the fuselage comprising an aerodynamically shaped shell defining a front, a rear, a top and a bottom of the fuselage and a passenger cabin therein having two forward-facing front seating positions for the pilot and a co-pilot or a passenger, and forward-facing rear seating positions for at least 2 passengers, optionally 3 passengers;
- a primary fuel cell mounted substantially behind the passenger cabin; a tail boom assembly extending from a tail boom bulkhead at the rear of the fuselage and including a tail rotor;
- a main rotor assembly comprising a hub, at least two main rotor blades mounted by a rotor mast to the top of the fuselage to permit the main rotor blades to rotate with respect to the fuselage;
- the front seating position for the pilot having a centre of mass at a first location substantially in front of the rotor hub location, and the primary fuel cell having a centre of mass at a second location substantially behind the rotor hub location;
- a landing gear arrangement;
- a power plant mounted substantially above and behind the passenger cabin, wherein the primary fuel cell is arranged to provide fuel to the power plant; and
- a secondary fuel cell having a centre of mass at a nose location in front of the rotor hub location by at least 1500 mm.

Providing first and second fuel cells arranged at different longitudinal positions along the helicopter can enable balancing of the helicopter, that is longitudinal shifting of the effective centre of mass of the fuel cells and therefore the helicopter as a whole, by filling the primary and secondary fuel cells to different fill levels. In particular, by filling the secondary fuel cell proportionally fuller than the primary fuel cell, the centre of mass of the helicopter can be shifted forward. In this way, the effective centre of mass of the helicopter can be kept as close to underneath the rotor hub location as possible, even under different loading conditions.

Optionally, the secondary fuel cell is maintained to a fill level to keep the helicopter centre of mass within 150 mm, preferably within 100 mm of a position directly below the rotor hub location.

Optionally, the forward-facing rear seating positions have a centre of mass arranged substantially below the rotor mast. This minimises the shift in the effective centre of mass of the helicopter under different passenger loading conditions. That is, in this arrangement, the effective centre of mass will not shift significantly forward or backwards whether there are three passengers or no passengers.

Optionally, the primary fuel cell has a greater length along the lateral axis than along the longitudinal axis. In particular, the length along the lateral axis (the width) of the primary fuel cell is maximised within the space constraints of the helicopter fuselage.

Optionally, the primary fuel cell has a greater height along the vertical axis than length along the longitudinal axis. In particular, the height of the primary fuel cell is maximised within the space constraints of the helicopter fuselage.

In view of the space constraints, it will be noted that the primary fuel cell may still be longer along the longitudinal axis than in its lateral or vertical dimensions.

Optionally, the helicopter further comprises a baggage compartment directly aft of the primary fuel cell along the longitudinal axis. In addition, provision may be made to retain baggage securely in the rear passenger cabin, in particular for use when a pilot is flying solo. Since the rear passenger cabin is preferably arranged under the rotor hub location, placing baggage in this area can assist with the centre of mass balancing.

Optionally, the secondary fuel cell is arranged to provide fuel directly to the power plant.

Optionally, the secondary fuel cell is arranged to transfer fuel to and from the primary fuel cell via a fuel supply line.

Optionally, the helicopter further comprises a pressure balancing valve arranged between the primary fuel call and the secondary fuel cell. One or more pressure balancing valves can automatically enable transfer of fuel between the primary and secondary fuel cells to artificially bring the centre of mass of the fuel forward to directly under the mast at all fuel levels. The pressure balancing valve preferably provides passive balancing of fuel along the helicopter.

Optionally, the secondary fuel cell is positioned entirely in front of the first location.

Optionally, the helicopter has a maximum gross mass of less than 2000 kg and an empty mass of less than 1000 kg.

Optionally, the helicopter has an occupant capacity of at least 4 occupants and at most 6 occupants.

Optionally, the primary fuel cell has a fuel capacity of at least 400 litres, preferably 600 litres or more.

Optionally, the secondary fuel cell has a fuel capacity of at least 50 litres, preferably 70 litres or more.

Optionally, the secondary fuel cell has a fuel capacity of less than 20% of the primary fuel cell, preferably around 15% or around 10% of the primary fuel cell.

Optionally, the helicopter further comprises a fuel pump for transferring fuel between the primary fuel cell and the secondary fuel cell, further optionally the fuel pump is operable to transfer fuel between the primary fuel cell and the secondary fuel cell during flight.

In one embodiment, the helicopter further comprises a mass distribution controller for receiving information relating to the loading of the helicopter and controlling the fuel pump to transfer fuel between the primary fuel cell and the secondary fuel cell to adjust the centre of mass of the helicopter, optionally wherein the information relating to the loading of the helicopter includes passenger cabin centre of mass information and fuel centre of mass information. This system provides more active balancing of fuel along the helicopter.

Optionally, the rotor mast has a length of less than 1500 mm, preferably less than 1000 mm.

There will normally be a swashplate assembly, the swashplate assembly having a rotatable upper swashplate coupled by upper control links to the main rotor blades and a lower swashplate coupled to cyclic and collective controls. The main rotor assembly usually has a centre of mass at a rotor hub location on the longitudinal axis substantially directly below the rotor mast.

As the skilled person will appreciate, corresponding methods of operation of the apparatus described herein are also envisaged and provided.

As noted above, an important consideration in the design of a helicopter is to ensure that it is balanced; that is to ensure its centre of mass remains within longitudinal and lateral limits specified for that aircraft in order to avoid fuselage rotations relative to the rotor which exceed the available range of the longitudinal cyclic pitch to trim the helicopter for equilibrium. However, the position of the centre of mass of a helicopter can change significantly under different operating conditions and between different flights. Two loads that are likely to change for a particular helicopter as it undertakes different journeys are those that arise from the amount of fuel and the number of passengers or other ballast that is being carried. Moreover, the amount of fuel being carried may vary significantly during each flight itself.

For a small helicopter in particular, these loads form a significant proportion of the total weight of the aircraft, as described in more detail below. As these weights change, the position of the centre of mass of the aircraft can also change significantly, affecting the balance of the helicopter.

To illustrate the issue, a typical situation might be that a lone pilot flies with a full tank of fuel to collect a group of passengers from a remote location. On the return journey, the fuel load may be roughly half the fuel load of the outward journey, but the loading in the aircraft fuselage may have increased six-fold. This will change the balance of a small helicopter significantly and keeping the centre of mass within the defined limits becomes a significant challenge.

For a small helicopter, one solution would be to increase the length of the rotor mast so that there is a longer moment arm between the rotors and the helicopter body. This means that changes in the longitudinal and lateral position of the centre of mass of the helicopter body due to different loading has a smaller effect on the balance of the helicopter.

However, increasing the length of the rotor mast can significantly increase aerodynamic drag for a helicopter and, in particular, increasing the length of the rotor mast can allow turbulent airflow to form between the helicopter body and the plane of the blades. This can significantly increase power requirements and fuel consumption for the helicopter.

Additional difficulties arise when seeking to provide a spacious cabin on a lightweight helicopter, which can further increase the moment arms of cabin seats and occupants about the rotor hub.

A system that addresses some of these issues will now be described in more detail below.

Helicopters are described by way of example only, in relation to the figures, in which:

FIGS. 1b to 1d show respectively a perspective view, a side view and cross-sectional views of the fuselage of the helicopter of FIG. 1a;

FIG. 1e shows a perspective view of the helicopter of FIG. 1a;

FIG. 2a shows a front view of the helicopter of FIG. 1a;

FIG. 2b shows a side view of the helicopter of FIG. 1a;

FIG. 3a shows a schematic diagram of a cross-section of the helicopter of FIG. 1a;

FIG. 3b shows a plan view schematic diagram of a cabin layout for the helicopter of FIG. 1a;

FIG. 4a shows a side view of a mass distribution apparatus of the helicopter of FIG. 1a;

FIG. 4b shows a perspective view of the mass distribution apparatus of FIG. 4a;

FIG. 4c shows a front view of the mass distribution apparatus of FIG. 4a;

FIG. 4d shows a flow chart of a mass distribution method of the helicopter of FIG. 1a;

FIG. 4e shows a flow chart of a mass distribution computing device of the helicopter of FIG. 1a;

Referring to FIGS. 1a to 4f, a light helicopter 100 will now be described. As will be appreciated by the skilled person, many of the features below will be implemented in other helicopter designs and the centre of mass balancing features described herein may be implemented on a wide variety of helicopters.

The helicopter 100 has an aerodynamic fuselage 1000, a tail boom assembly 1200, a main rotor assembly 2000, a power plant 3000 and a landing gear arrangement 4000. The fuselage 1000 comprises a shell 1010, where the shell 1010 defines a top 1020, bottom 1022, front 1024, rear 1026, left 1027 and right 1028 of the fuselage 1000. The fuselage 1000 also has a length 1002 from the front 1024 to the rear 1026, and a maximum width 1004.

Figure 1A:
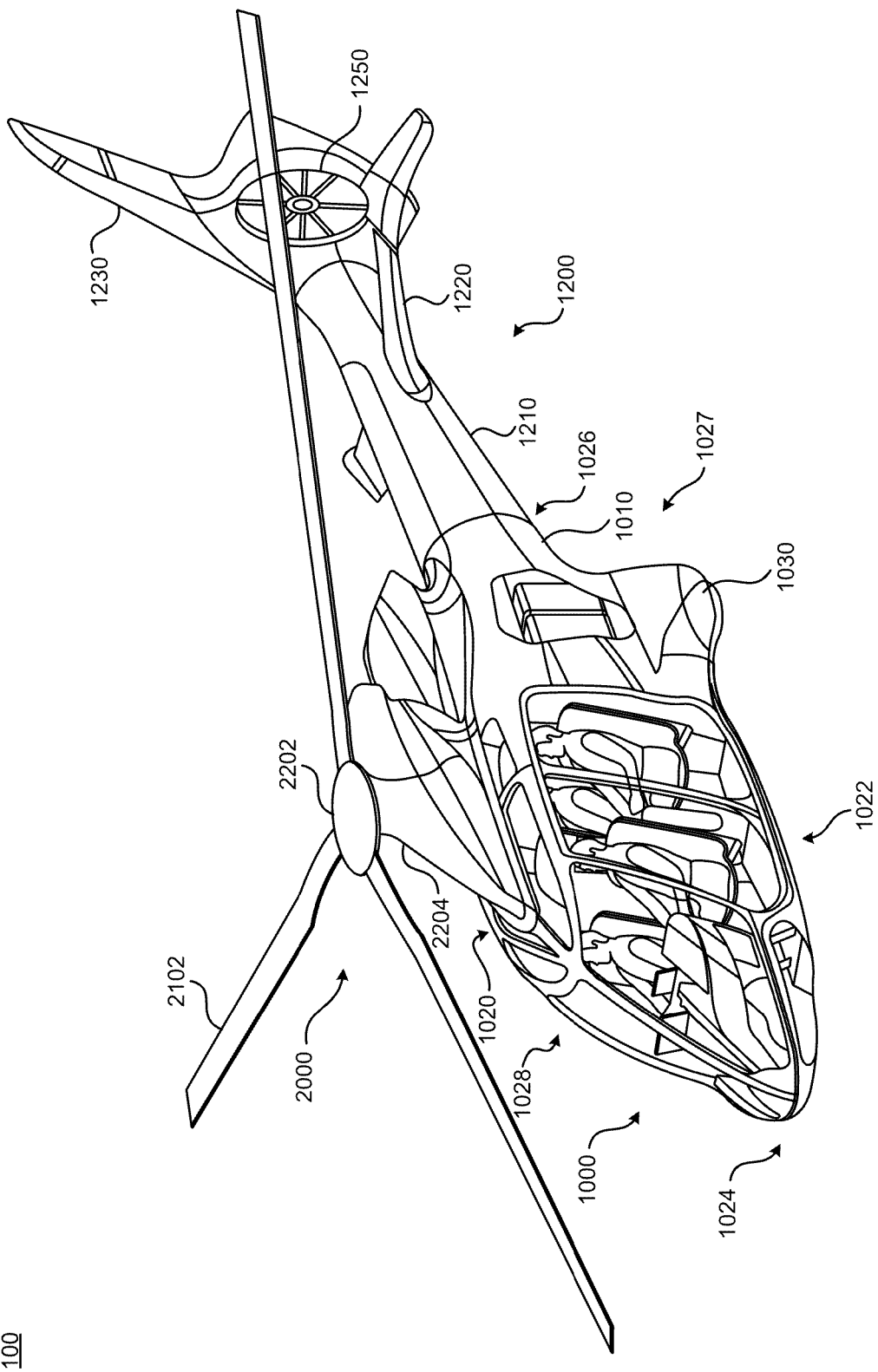
FIG. 1a shows a perspective view of an example helicopter.
Figure 1B:
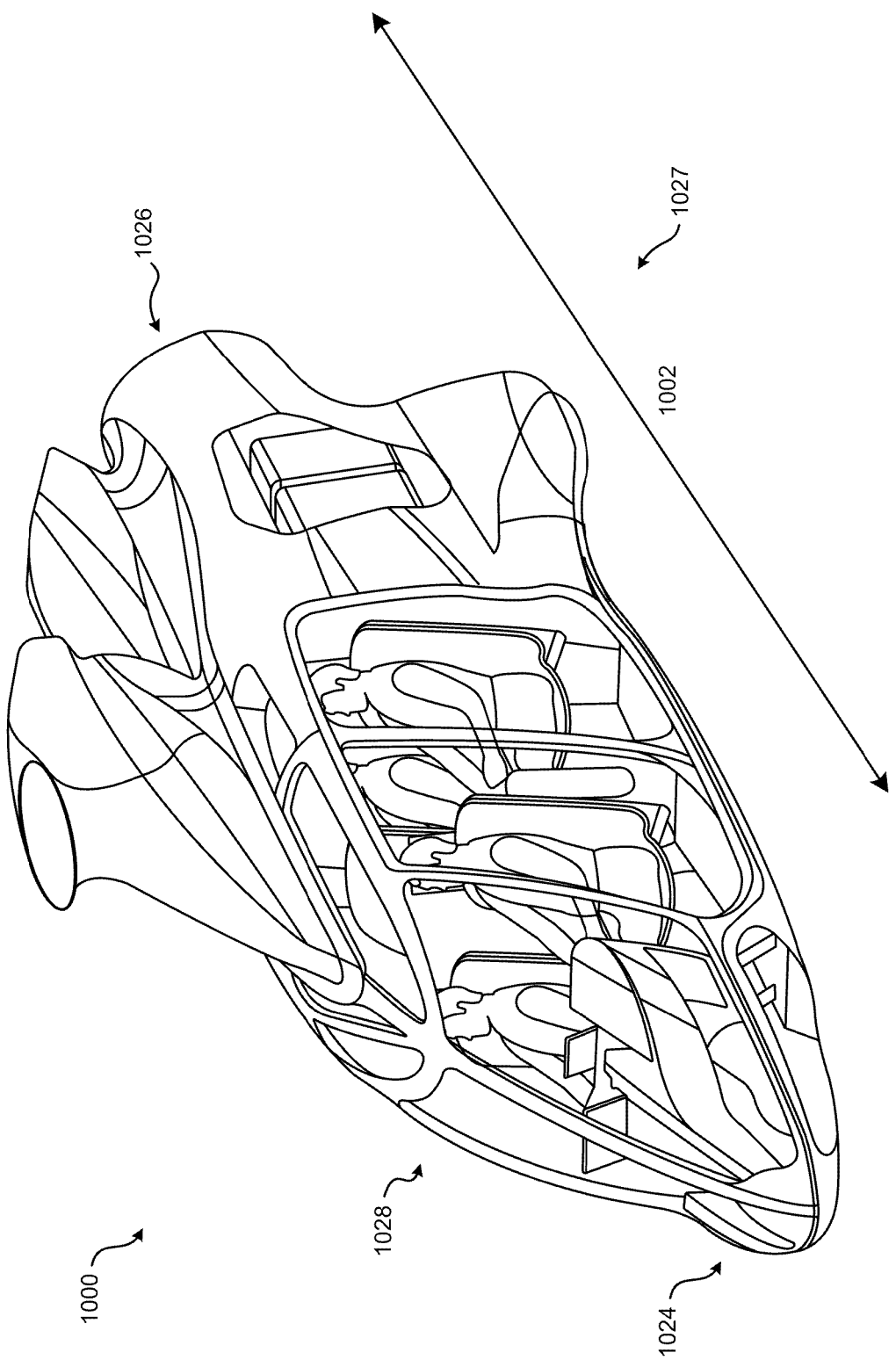
Figure 1C:
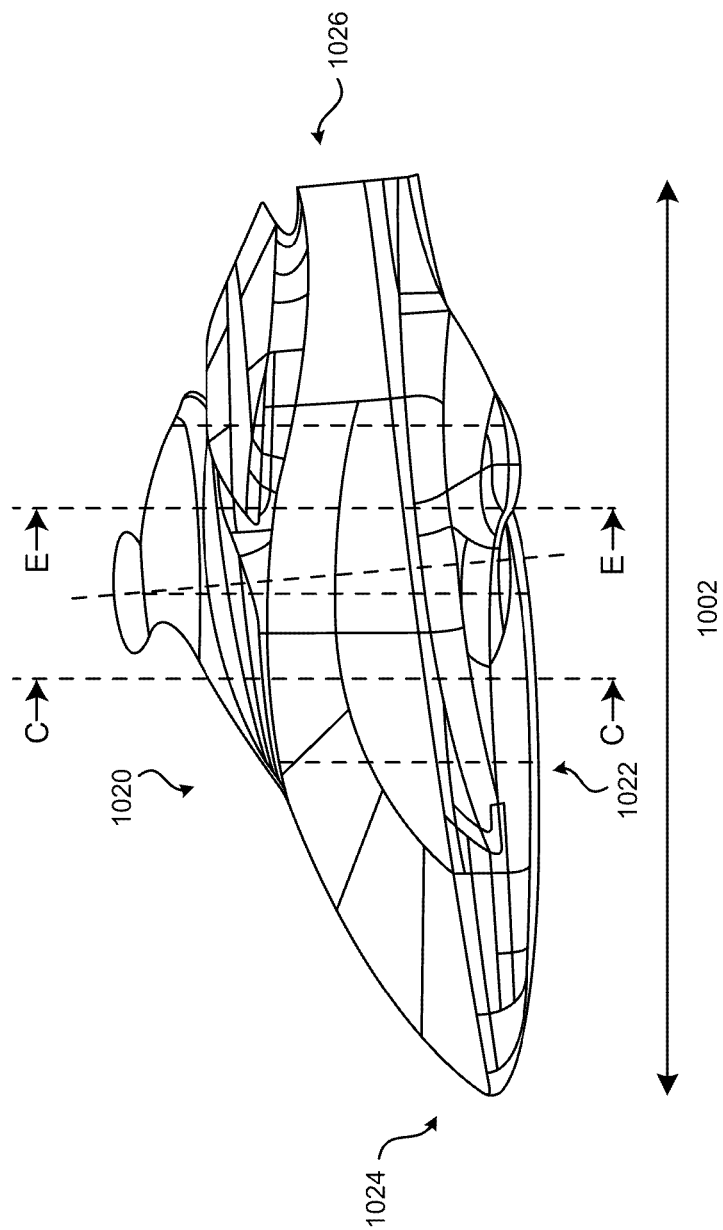
Figure 1D:
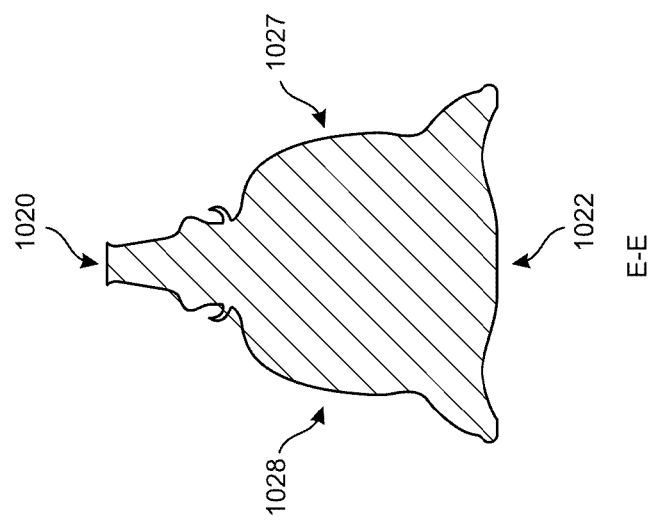
Figure 1D:
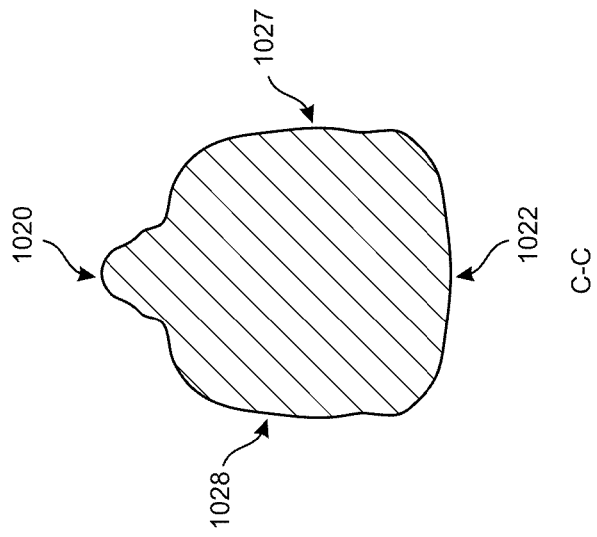
Figure 1E:
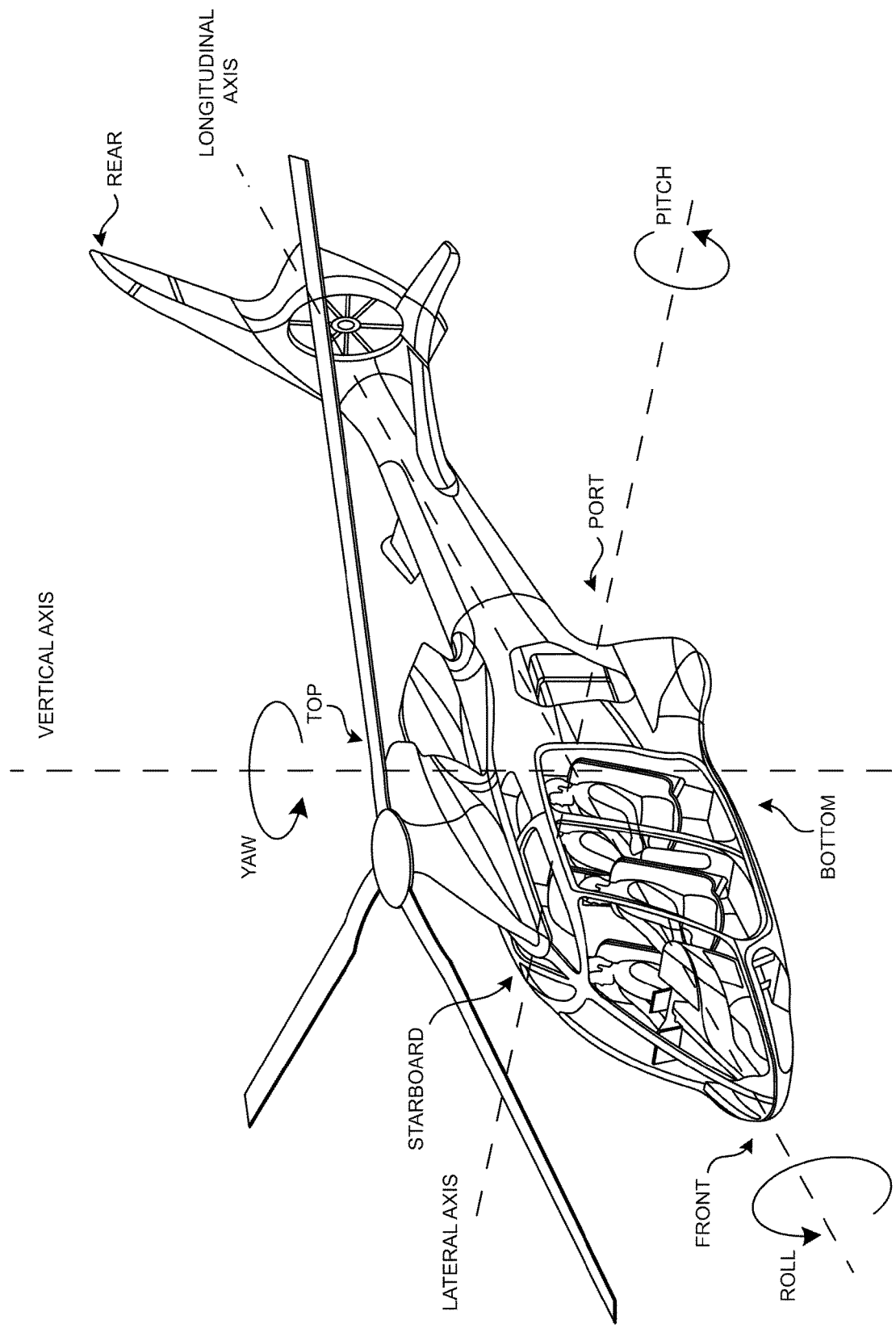
Figure 2A:
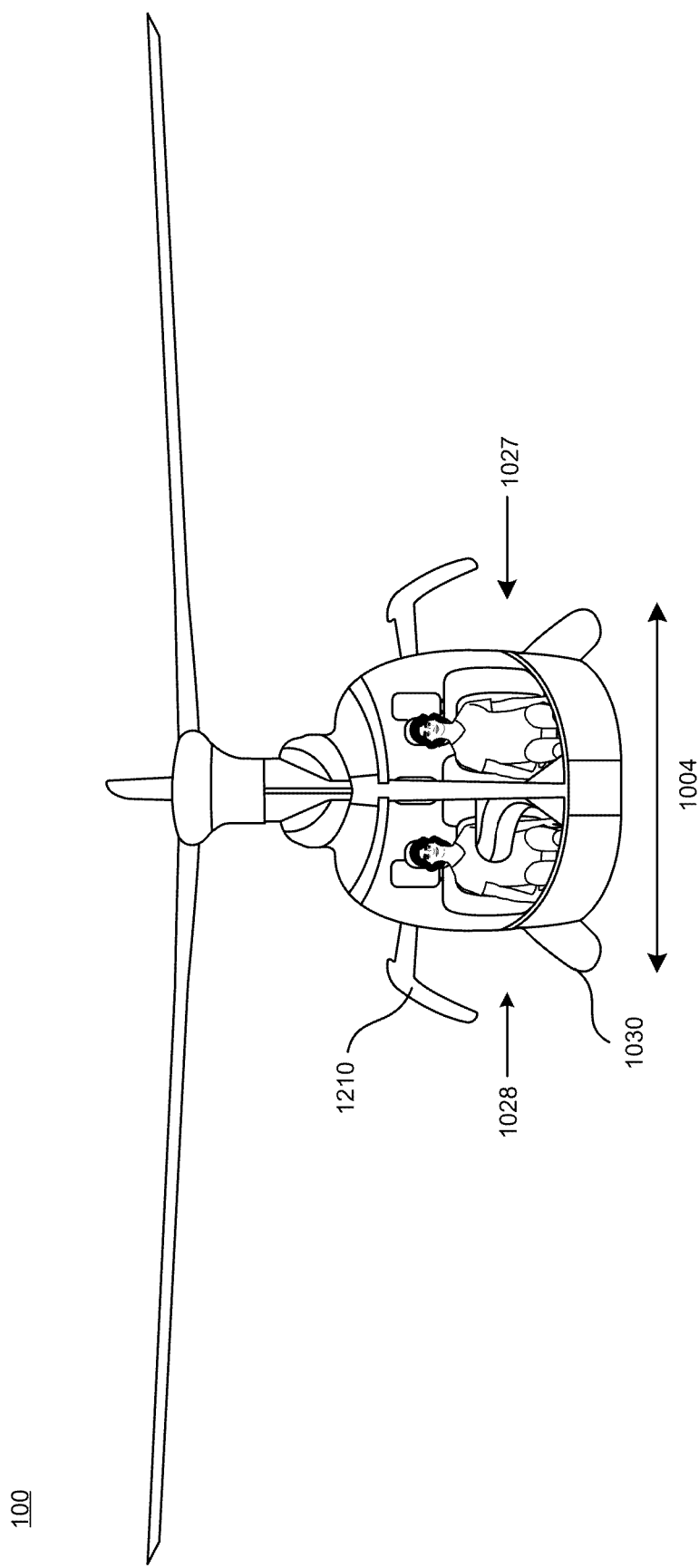
Figure 2B:
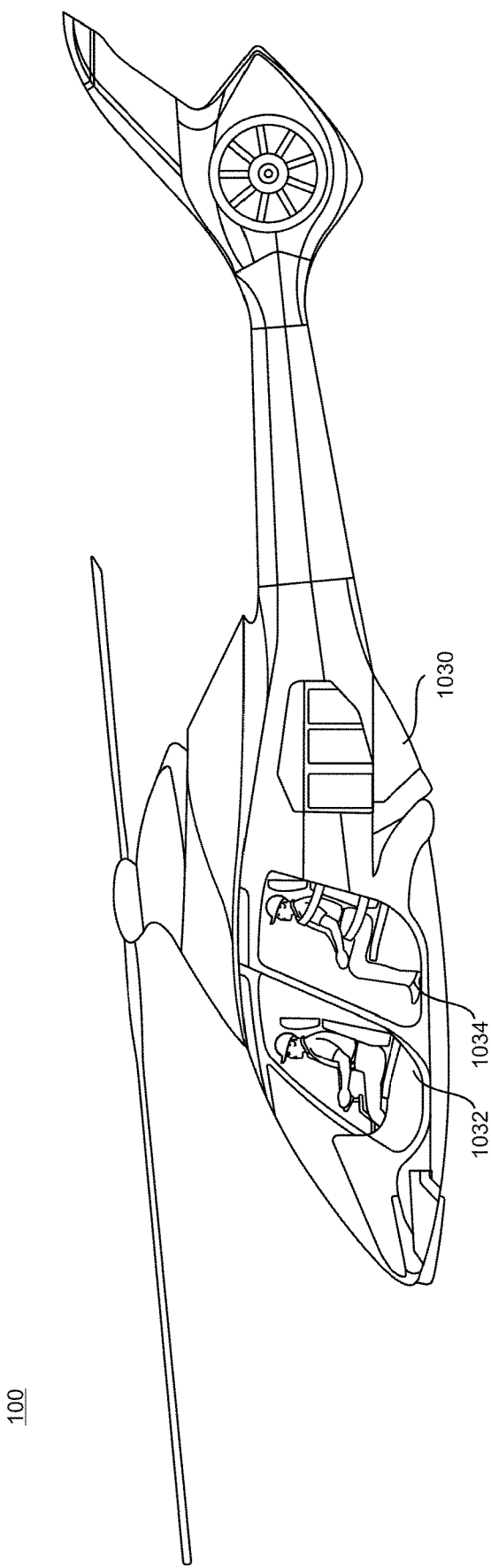

Referring to FIG. 1e, the helicopter 100 has a front, rear, left, right, top and bottom. The left and right may alternatively be referred to as port and starboard respectively. The helicopter 100 has a longitudinal axis, a lateral axis and a vertical axis. The longitudinal axis extends between the front and the rear of the helicopter 100. The lateral axis extends between the left and the right of the helicopter 100. A direction parallel to the lateral axis is a transverse direction, and in forward flight is generally horizontal and perpendicular to the direction of forward travel. An outward direction is substantially parallel to the lateral axis and away from the longitudinal axis. An inward direction is substantially parallel to the lateral axis and towards the longitudinal axis. The vertical axis extends between the top and the bottom of the helicopter 100. In forward flight, the vertical axis is substantially vertical and perpendicular to the direction of forward travel.

Standard aeronautical terms aft and fwd are used. Aft or rearward is used here to mean towards the rear of the helicopter 100 or away from the direction of forward travel. Fwd, fore or forward, is used here to mean towards the front of the helicopter 100 or towards the direction of forward travel.

A first component forward of or in front of a second component is positioned closer to the front of the helicopter 100 along the longitudinal axis than the second component, although is not necessarily positioned on the longitudinal axis itself Similarly, a first component backward of or behind a second component is positioned closer to the rear of the helicopter 100 along the longitudinal axis than the second component, although is not necessarily positioned on the longitudinal axis itself. A first component upward of or above a second component is positioned closer to the top of the helicopter 100 along, although not necessarily on, the vertical axis than the second component. Similarly, a first component below, beneath, under or downward of a second component is positioned closer to the bottom of the helicopter 100 along the vertical axis than the second component.

Pitch of the helicopter 100 is a rotation of the helicopter 100 about the lateral axis. Yaw of the helicopter 100 is a rotation of the helicopter 100 about the vertical axis. Roll of the helicopter 100 is a rotation of the helicopter 100 about the longitudinal axis.

The helicopter 100 has a centre of gravity (CoG) or centre of mass (CoM), defined as a point in 3-dimensional space about which the weight of the helicopter 100 applies no moment force or torque. Optionally the centre of mass can be the intersection of the longitudinal, lateral and vertical axes. Rotor blades of the main rotor assembly have a centre of rotation in a plane of rotation at a rotor hub location. The rotor hub location can act as a datum location from which the location of other components of or positions in the helicopter 100 are referenced. The helicopter 100, when empty, may have a nominal centre of mass at a location longitudinally near to the rotor hub location.

The term "rotor head" may be used herein as an alternative term for "rotor hub". Moreover, the "rotor hub" described herein may simply refer to the central rotating hub to which the blades are coupled.

The helicopter 100 has landing gear (not shown in any of FIGS. 1a to 1e) to support the helicopter 100 when on the ground. The landing gear may be fixed or retractable and may include skids or wheels. The landing gear provides a base for the helicopter 100 when on the ground, vertices of the base defined by points of contact between the landing gear and the ground. The helicopter 100 remains stable on the ground if the line of action of the weight of the helicopter intersects the base. Skids form points of contact substantially parallel to the longitudinal axis of the helicopter 100. As such, the base is generally rectangular. Three or more wheels may be used for the landing gear. If three wheels are used, two may be disposed towards the rear and one towards the front of the helicopter 100. This provides a generally triangular base. A width of the base may be referred to as a track width or a track, and may be the maximum width of the base perpendicular to the longitudinal axis.

The fuselage 1000 has a generally elongate, streamlined and/or shark-like form. The helicopter 100 has a low drag coefficient in level forward flight, around 0.1 but at least less than around 0.2. This is in part provided by the fuselage 1000 and tail boom assembly 1200 defining a smooth continuous outer surface formed of flush-fitting composite such that, during flight, minimal or no protrusions extend from the fuselage 1000 or tail boom assembly 1200 into an airflow. The portion of the outer surface defined by the front 1024 of the fuselage 1000 is a substantially convex surface.

Towards the rear 1026 and bottom 1022 and on each of the left 1027 and right 1028 sides of the fuselage, the fuselage 1000 comprises a wheel fairing 1030. The wheel fairings 1030 project generally outwardly and downwardly from the rear 1026 of the fuselage 1000 and provide lateral stability for the helicopter 100 when in forward flight.

A pilot can provide cyclic and collective control inputs to control the helicopter 100 in flight. The main rotor assembly 2000 comprises rotor blades 2102 coupled to and configured to rotate with a central hub about an axis of rotation provided by a rotor mast extending from the top 1020 of the fuselage, the hub enclosed by a rotor hub fairing 2202. Each blade 2102 is configured to rotate at the root about its length so as to change its angle of attack. An upper swashplate and a lower swashplate are disposed about the mast and are arranged such that they collectively tilt and move up and down the mast. The upper swashplate rotates with the blades 2102 and has an upper control link coupled to each rotor blade 2102 to cause each rotor blade 2102 to twist about its length.

The lower swashplate is non-rotating and receives control input from the pilot's cyclic and collective controls, wherein a cyclic control input causes the lower swashplate to tilt and a collective control input causes the lower swashplate to move up or down the mast. Such tilting or movement is replicated in the upper swashplate, causing the angle of attack and therefore lift force generated by each blade 2102 to change. The tilt of the lower swashplate may also be described as a rotation of the lower swashplate about its lateral and longitudinal axes.

A cyclic input causes the swashplates to tilt, meaning the pitch of each blade 2102 varies as it rotates around the hub between a maximum at the azimuth corresponding to the highest point of the lower swashplate, and a minimum at the azimuth corresponding to the lowest point of the lower swashplate. By way of example, the pilot may provide a longitudinal cyclic input by moving a cyclic control towards the front (fwd) or the rear (aft) of the helicopter 100, thus tilting the swashplates causing the rotor blades 2102 to achieve a maximum lift when towards the rear or front respectively and a minimum lift when towards the front or rear respectively. This varies the fwd and aft movement of the helicopter 100 and induces a change in pitch of the front 1024 or nose of the helicopter 100 (downwards when moving fwd or forwards, upwards when moving aft or backwards). In forward flight, longitudinal cyclic control input can be used to adjust the forward speed and thus pitch of the helicopter 100. Similarly, a lateral cyclic input to the left 1027 or right 1028 tilts the swashplates laterally, causing the helicopter to move towards the left 1027 or right 1028. This induces roll, i.e. rotation about a longitudinal axis of the helicopter 100, to the left 1027 or right 1028.

A collective input provides a uniform change in pitch for all of the blades 2102, resulting in an overall change in lift for the helicopter 100. In a hover or level flight, an increased collective input therefore causes the helicopter 100 to climb vertically or upwards, and a decreased collective input causes the helicopter 100 to descend vertically or downwards. In pitched (forward) flight, a collective input can be used to vary the speed of the helicopter 100 without varying the pitch of the helicopter 100, but will induce an ascent or descent.

Further, anti-torque control input provided by the pilot, typically via left and right pedals, controls the angle of attack of tail rotor blades in the tail rotor assembly 1200. This varies the torque applied by a tail rotor 1250, so can be used to adjust the yaw or yaw rate (i.e. the bearing direction) of the helicopter 100 in hover. In forward flight, an anti-torque control input varies the side-slip angle of the helicopter 100, i.e. the angle between the direction of travel and the heading of the helicopter 100. Cyclic, collective and anti-torque controls can be used in any combination to achieve a range of manoeuvres and flying conditions.

Figure 3A:
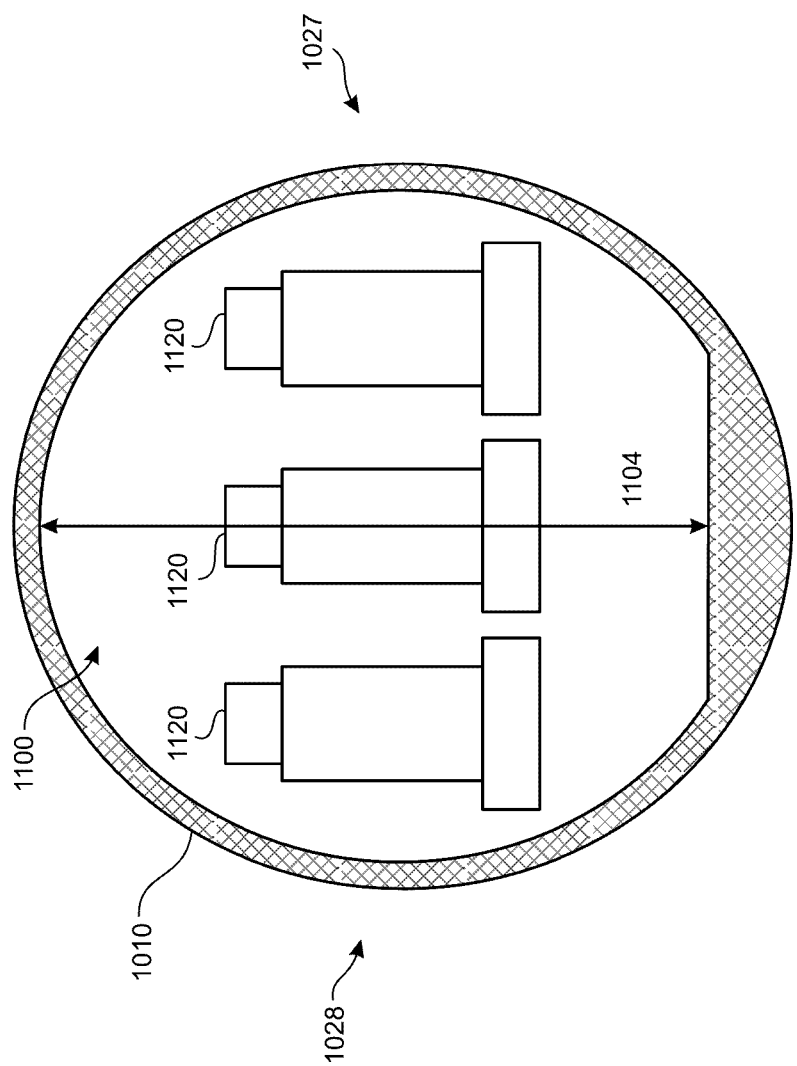
Figure 3B:
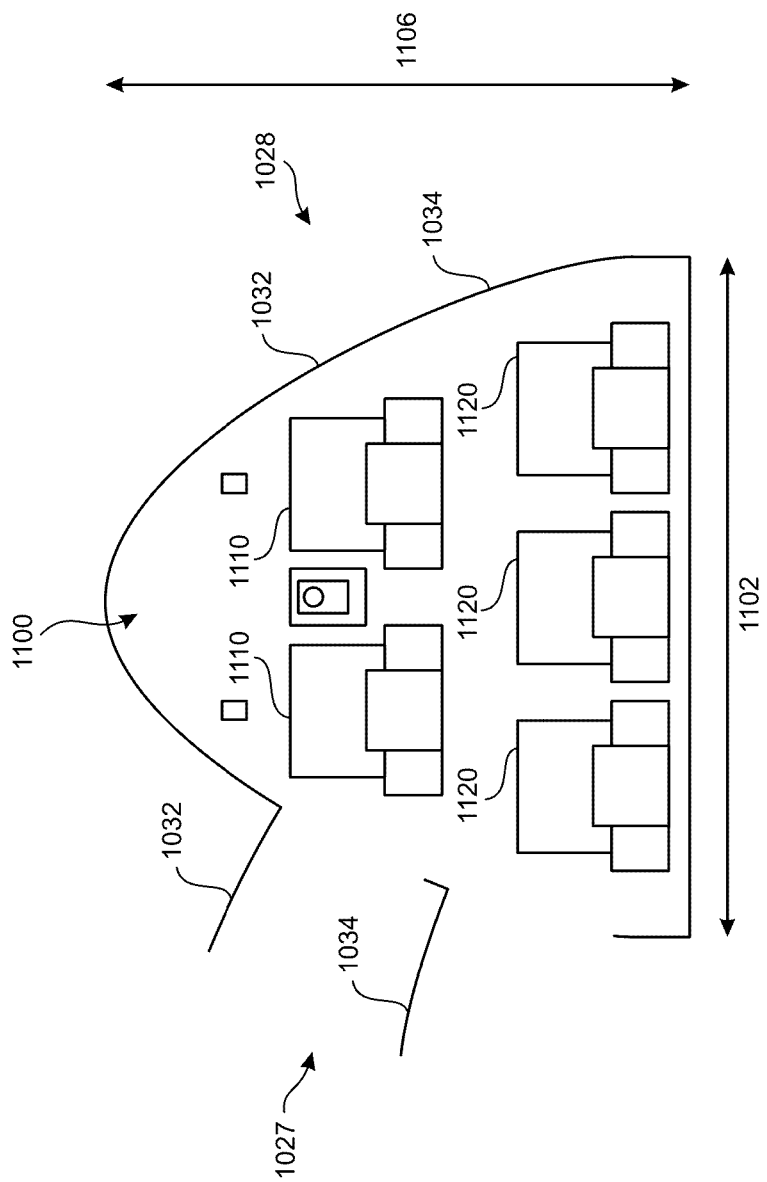

As shown in FIGS. 3a and 3b, within the fuselage 1000 exists a cabin 1100 providing a cavity for holding a pilot and any other occupants. The cabin 1100 has a maximum width 1102, a maximum height 1104 and a maximum length 1106. The cabin 1100 is arranged to hold 5 or fewer occupants, preferably arranged across 2 forward-facing front seating positions 1110 for the pilot and a co-pilot or passenger, and 3 forward-facing rear seating positions 1120 for additional passengers and/or cargo such as luggage. The cabin 1100 may further include an additional forward-or rear-facing rear seating position (not shown in the figures). The rear seating positions 1120 may include three or four individual seats, or a bench. The front seating positions 1110 are accessible via front doors 1032 and the rear seating positions 1120 are accessible via rear doors 1034. The front and rear doors 1032, 1034 when closed form a flush exterior surface homogeneous with the left 1027 and right 1028 surfaces of the fuselage 1000.

Within the rear 1026 of the fuselage 1000 behind the cabin 1100 exists a storage cavity 1040, for example to store luggage or other cargo during flight, and a fuel cavity 1050 adjacent the storage cavity 1040. In addition, there is a nose cavity 1060 in the front 1024 of the fuselage 1000 located at least partially forward of the front seating positions 1110.

As shown in FIGS. 1C and 1d, the fuselage 1000 has a maximum cross-section between a location C 2000 mm from the front 1024 of the fuselage 1000 and a location E 3000 mm from the front 1024 of the fuselage 1000. The maximum cross-section of the fuselage 1000 is around 3 m2. This allows sufficient space for the cabin 1100 to hold up to 3 occupants in the rear seating positions 1120 comfortably in a seated position.

Stabilisers are fixed or adjustable aerodynamic surfaces such as wings or fins which are used to provide stability for the helicopter 100 in flight. For example, stabilising wings can extend in a transverse or lateral direction from the helicopter 100 and provide horizontal stability for the helicopter 100 by stabilising the pitch of the helicopter 100. Stabilisers extending in a vertical direction stabilise the yaw of the helicopter 100.

The tail boom assembly 1200 has a tail boom 1210, stabilising wings 1220 and a ducted tail rotor 1250. The tail rotor 1250 is configured to provide a thrust which creates a torque to counteract a torque produced by the main rotor assembly 2000. The tail boom 1210 has an internal cavity where a tail fuel tank may be placed. The wings 1220 take a generally aerofoil cross-section and extend outwardly from the tail boom 1210 first in a lateral direction and then in an oblique direction outwardly, downwardly and rearwardly. The wings 1210 provide horizontal stability in pitch and yaw for the helicopter 100 in forward flight. The tail boom assembly 1200 also includes a tail fin 1230 integrally formed with the tail boom 1210 and extending rearwardly beyond the tail rotor 1250 in a substantially vertical plane. When the helicopter 100 is in forward flight, the tail fin 1230 provides a lift which creates an additional torque about the centre of the helicopter 100 to counteract the torque produced by the main rotor assembly 2000. By extending beyond the tail rotor 1250, the torque produced by the tail fin 1230 is increased.

The helicopter 100 has an empty mass of around 850 kg. The maximum gross weight of the helicopter 100 is around 1650 kg internally, and 1850 kg externally. The helicopter 100 has an internal payload including fuel of 800 kg and an external payload including fuel of 1000 kg. "Internal" refers to the weight of components inside a helicopter, including passengers, fuel and the helicopter itself. "External" refers to internal weight plus any external loads (excluding aerodynamic loads) such as cargo suspended below a helicopter during flight.

Figure 4A:
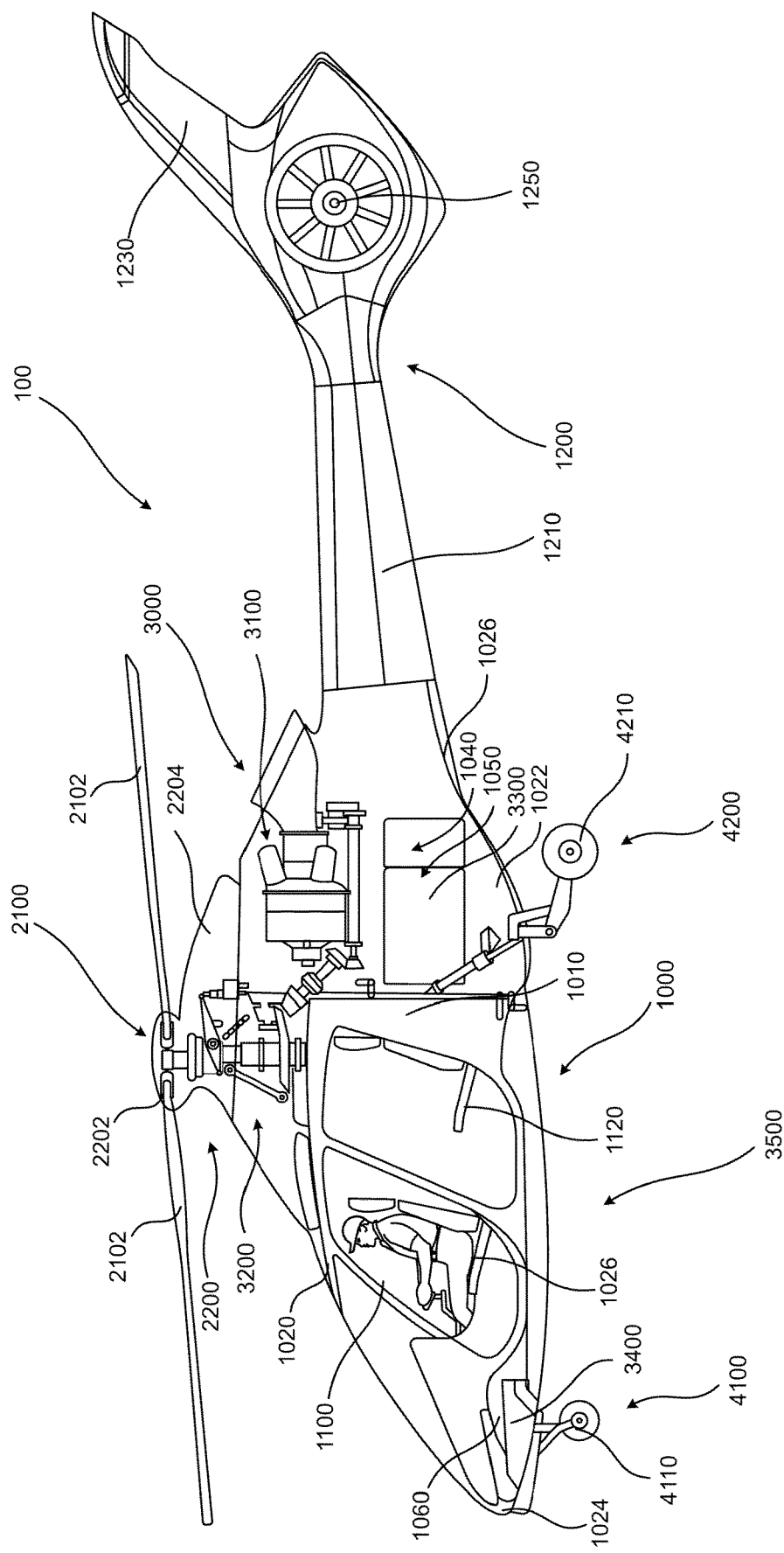
Figure 4B:
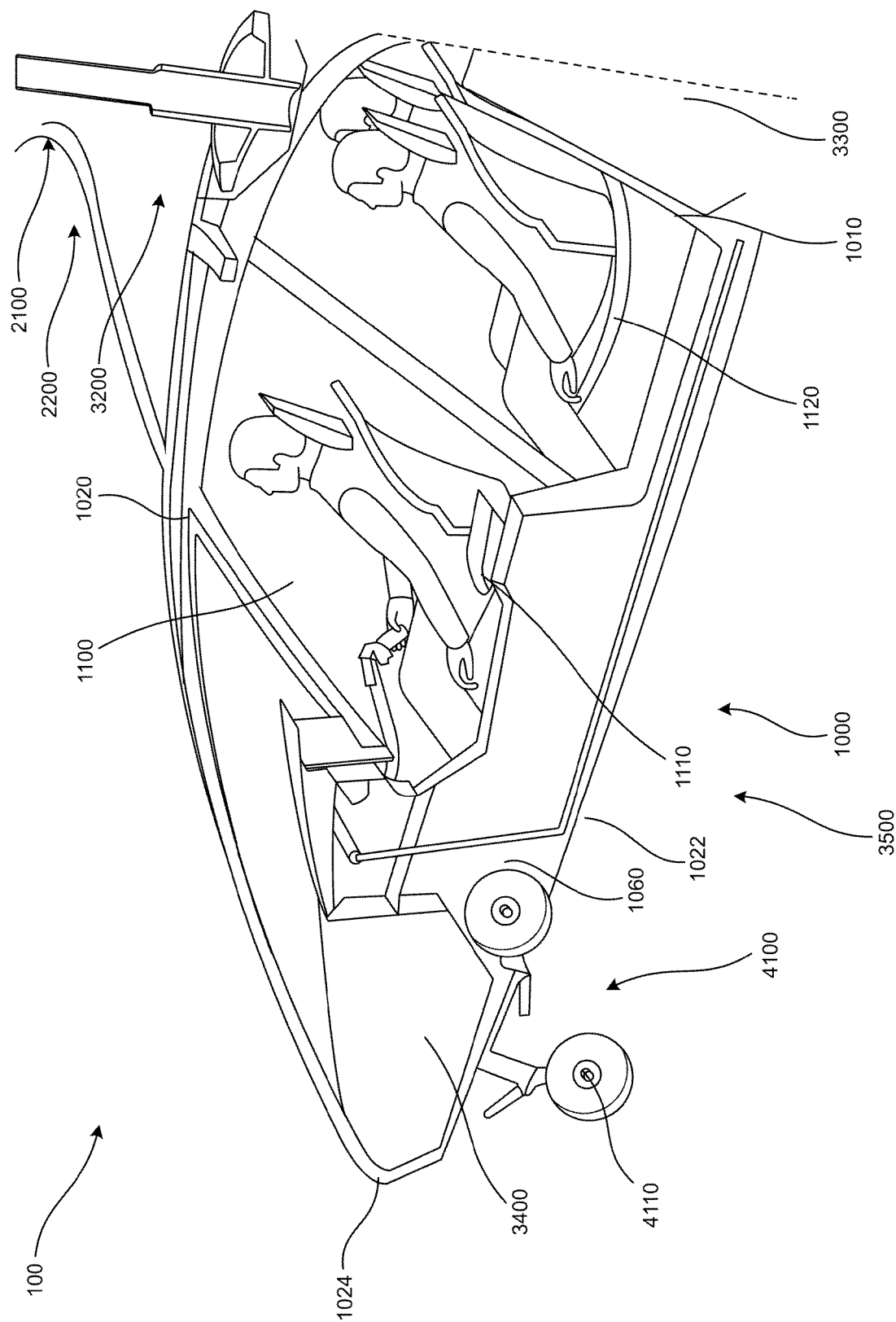
Figure 4C:
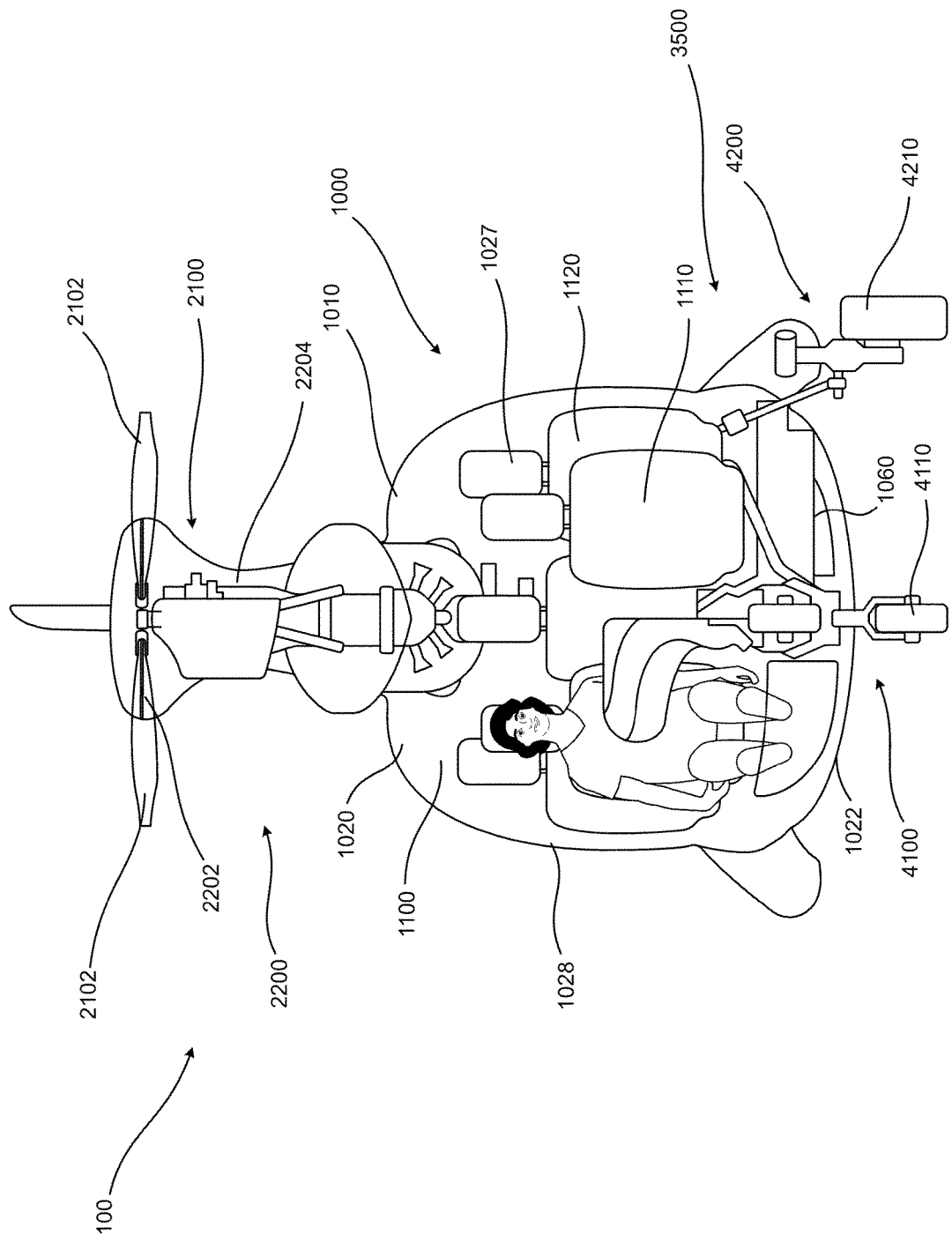

As shown in FIGS. 4a-c, the helicopter 100 includes a primary fuel cell 3300 disposed behind the cabin 1100 in the fuel cavity 1050. The primary fuel cell 3300 comprises one or more primary fuel tanks 3310 and one or more primary bladders 3320, where the one or more primary bladders 3320 line the fuel cavity 1050 and the one or more primary fuel tanks 3310 are mounted directly therein. The primary fuel cell 3300 has a maximum fuel capacity of around 660 litres.

A secondary fuel cell 3400, or trimmer tank, is disposed in the nose cavity 1060 substantially in front of and at least not directly beneath the front seating positions 1110 and is fluidly connected to the primary fuel cell 3300 and/or the engine 3100. The secondary fuel cell 3400 comprises one or more secondary fuel tanks 3410 and one or more secondary bladders 3420, where the one or more secondary bladders 3420 line the nose cavity 1060 and the one or more secondary fuel tanks 3410 are mounted directly therein. The secondary fuel cell 3400 has a maximum fuel capacity of around 76 litres.

The terms "fuel tank" and "fuel cell" may be used interchangeably herein. Moreover, the "primary fuel cell"

may also be referred to as the "main tank" and the "secondary fuel cell" may also be referred to as the "trim tank" or "trimmer tank".

The power plant 3000 has an engine 3100 which is rated to provide a maximum continuous power output of around 300 kW.

When the helicopter 100 is in a hover at 10,000 ft in an ISA+15° C., the tail rotor 1250 consumes between around 43 kW and 48 kW or between 13% and 17% of the power output from the engine 3100. In an ISA+15° C., the helicopter 100 has a hover out of ground effect (HOGE) ceiling of around 10,000 ft. In the same atmosphere the helicopter 100 has a hover in ground effect (HIGE) ceiling of more than around 10,000 ft.

When in forward flight and loaded with its maximum gross weight at 10,000 ft in an ISA+15° C., the helicopter 100 can achieve a maximum cruising speed of around 90 m/s an a Vne of around 102 m/s. At the maximum cruise speed of 90 m/s, the engine 3100 burns fuel at a rate of around 140 litres per hour.

When loaded with its maximum gross weight, the helicopter 100 is capable of climbing vertically at a rate of around 4.8 m/s at sea level in an ISA and at a rate of around 1.8 m/s at 10,000 ft in an ISA+15° C. When loaded with its maximum gross weight and travelling with a forward speed of around 40 m/s, the helicopter 100 is capable of climbing with a rate of 13 m/s.

The helicopter 100 has a maximum range of around 1750 km when travelling in forward flight in an ISA with 15° C. of variation at 10,000 ft with an occupant weight of 1600 kg and a take-off fuel volume of 650 litres at 90 m/s. The range of a flight including a standard take-off and landing procedure, the flight being predominantly at sea level in an ISA atmosphere with a combined occupant and luggage/cargo weight of 1650 kg, a take-off fuel volume of 300 litres and a cruising speed of 70 m/s, is around 950 km.

Referring to FIG. 4a the powerplant 3000 further comprises a longitudinal mass distribution apparatus 3500. Mass distribution may be critical in all types of aircraft, including helicopters 100 and it will be appreciated that the mass distribution system described below is not limited to the helicopter described above, but may be used in many different types of aircraft, in particular in larger helicopters.

For a helicopter 100, it is preferable for the centre of mass to be positioned as close as possible to a point directly below the rotor mast 2104. A helicopter 100 will have a centre of mass normal operating range in which the pilot has adequate control of the helicopter 100 as explained below. The range for the centre of mass is dependent on the design requirements of the helicopter 100. If the centre of mass is positioned away from the rotor mast 2104, which may act as a pivot point with the helicopter 100 body suspended below, then the helicopter 100 will tilt downwards at the position of the centre of mass. In order to counteract the tilt of the helicopter 100, and to return the helicopter 100 the operational position, known in the art as the trimmed position, the pilot must input cyclic control in the opposite direction to the tilt. For example, if the centre of mass shifts fwd, then the pilot must input rearward cyclic input to counteract the mass shift and vice versa. Similarly, if the centre of mass shifts to port during flight, then the pilot must input starboard cyclic input to counteract the mass shift and vice versa. Therefore, if the position of the centre of mass of the helicopter 100 varies then the pilot may be required to vary the amount of counteracting cyclic input. The safety and efficiency effects of the centre of mass operating range are mentioned below with respect to the longitudinal mass distribution method 3600.

Before take-off it is desirable for the helicopter 100 mass to be distributed appropriately. In other words, the centre of mass should be well within the normal operating range mentioned above. The centre of mass position before take-off may be affected by several factors, but, in particular, by different amounts, and positioning, of payload, i.e. passengers, luggage etc. For example, as in this embodiment, the helicopter 100 may comprise more than one seating position 1110, 1120 which may result in several different possible seating arrangements or combinations. If only a pilot is present in the front seating position 1110 then the centre of mass may shift forward, however, if several passengers are present in the rear seating position 1120 then the centre of mass may shift rearward.

The mass distribution may also shift during flight. By the end of a flight, particularly in long flights, the mass distribution may change significantly because the fuel is used up during flight. Depending on the position, both longitudinal and lateral position, of the fuel tank 3310, the helicopter 100 centre of mass may shift.

In summary, the nominal centre of mass should be maintained below the mast as far as possible, hence an empty helicopter has a rearward centre of mass until loaded. The cabin is fore of the mast, and so a loading configuration with only the pilot will result in a rearward net centre of mass, whereas a fully loaded state brings the centre of mass forward. Since the fuel tank is arranged behind the mast, a full fuel tank takes the centre of mass rearwards, and this then moves forwards as fuel is used.

The longitudinal mass distribution apparatus 3500 as claimed aims to mitigate the mass distribution effects encountered before and during flight as mentioned above.

The longitudinal mass distribution apparatus 3500 comprises a primary fuel cell 3300 and a secondary fuel cell 3400. Fuel may be filled into the primary fuel cell 3300 while the helicopter 100 is parked and the secondary fuel cell 3400 may be filled via the primary fuel cell 3300. It is also possible for the fuel to be directly filled into the secondary fuel cell 3400, instead of, or as well as, via the primary fuel cell 3300 within the scope of the invention.

In this embodiment, the primary fuel cell 3300 is fluidly coupled to the engine 3100. In other words, there is a connection between the primary fuel cell 3300 and the engine 3100, but this connection may be provided via a fuel pump 3510 or other component.

In this embodiment, the secondary fuel cell 3400 is also fluidly coupled to the engine 3100. In other words, there is a connection between the secondary fuel cell 3400 and the engine 3100, but this connection may be provided via a fuel pump 3510 or other component. It is also possible for the secondary fuel cell 3400 to connect to the engine 3100 through, or via, the primary fuel cell 3300. In other words, the secondary fuel cell 3100 may be used to refill the primary fuel cell 3300.

In an alternative embodiment, the secondary fuel cell 3400 may be fluidly coupled to the engine 3100 but along a separate connection to the primary fuel cell 3300. In other words, the primary fuel cell 3300 and the secondary fuel cell 3400 provide distinctly separate sources for the engine 3100. However, in this alternative embodiment, the secondary fuel cell 3400 may need to be filled up separately to the primary fuel cell 3300.

In this embodiment, the primary fuel cell 3300 may be positioned in a fuel cavity 1050. The primary fuel cell 3300 may comprise one or more primary fuel tanks 3310 and one or more primary bladders 3320, in which the one or more primary bladders 3320 line the fuel cavity 1050 and the one or more primary fuel tanks 3310 are mounted directly therein.

In this embodiment, the secondary fuel cell 3400 is disposed in the nose cavity 1060. The secondary fuel cell 3400 comprises one or more secondary fuel tanks 3410 and one or more secondary bladders 3420, in which the one or more secondary bladders 3420 line the nose cavity 1060 and the one or more secondary fuel tanks 3410 are mounted directly therein.

Below the standard aeronautical terms aft and fwd are used. Aft meaning towards the rear of the helicopter 100 or away from the direction of forward travel. Fwd meaning towards the front of the helicopter 100 or towards the direction of forward travel.

The primary fuel cell 3300 centre of mass is positioned aft of the secondary fuel cell 3400 centre of mass. In other words, most of the primary fuel cell 3300 is positioned behind the secondary fuel cell 3400 with respect to the longitudinal direction. By positioning the primary fuel cell 3300 and the secondary fuel cell 3400 in different longitudinal positions this gives the ability to vary the longitudinal mass distribution depending on the volumetric usage of each of the fuel cells 3300, 3400.

The primary fuel cell 3300, as the name suggests, is likely to be the principal fuel supply for the engine 3100. Therefore, it is likely that the fuel reserves required for the flight, are stored primarily, or solely, in the primary fuel cell 3300. The secondary fuel cell 3400 may only be used for mass distribution purposes, and the secondary fuel reserves are not used. However, it is preferable that the secondary fuel reserves in the secondary fuel cell 3400 are used as part of the overall fuel reserves for the flight as this may reduce the overall fuel mass requirement. In other words, the secondary fuel cell 3400 may provide additional capacity for the overall fuel reserves and may not solely be used for mass distribution purposes.

It is preferable that a passenger cabin 1100 centre of mass is positioned fwd of the rotor mast 2104. In other words, most of the passenger cabin 1100 is positioned in front of the rotor mast 2104. By positioning the passengers in front of the rotor mast 2104 and surrounding rotor control assembly 2100, the passengers are less likely to be affected by the rotor 2100 noise. In this embodiment, the passenger cabin 1100 comprises a front seating position 1110 and a rear seating position 1120. In more detail, the front seating position 1110 comprises one pilot seat and one passenger seat, and the rear seating position 1120 comprises three passenger seats. In this embodiment, the rear seating position 1120 is positioned partly under the rotor mast 2104, however, the centre of mass of the passenger cabin 1100 is still in front of the rotor mast 2104.

It is preferable that the primary fuel cell 3300 centre of mass is positioned aft of the rotor mast 2104. In other words, most of the primary fuel cell 3300 is positioned behind the rotor mast 2104. By positioning the primary fuel cell 3300 behind the rotor mast 2104, and therefore behind the passenger cabin 1100, the primary fuel 3300 may act as ballast to counteract the mass of the passenger cabin 1100. It is also common for the engine 3100 to be positioned near to the rotor control assembly 2100 to reduce the transmission distance, and behind the passenger cabin 1100 to reduce the cabin noise. Therefore, the engine 3100 may also act as ballast to counteract the mass of the passenger cabin 1100.

By positioning the primary fuel cell 3300, and the engine 3100, behind the rotor mast 2104 it may require the passenger cabin 1100 to mainly provide the forward ballast. As mentioned above, the mass of the passenger cabin 1100 may vary depending on the number of passengers onboard before take-off. To maintain an overall centre of mass for the helicopter 100 that is within the normal operating limits it is preferable that the secondary fuel cell 3400 centre of mass is positioned fwd of the rotor mast 2104. In other words, most of the secondary fuel cell 3400 is positioned in front of the rotor mast 2104. By positioning the secondary fuel cell 3400 in front of the rotor mast 2104 the secondary fuel cell 3400 may counteract any changes in the mass of the passenger cabin 1100.

The primary fuel cell is preferably designed such that its longitudinal extent is minimised and its lateral and vertical dimensions are maximised within the space constraints of the helicopter fuselage.

In this embodiment, the secondary fuel cell 3400 centre of mass is positioned fwd of the passenger cabin 1100 centre of mass. In other words, most of the secondary fuel cell 3400 is positioned in front of most of the passenger cabin 1100. By positioning the secondary fuel cell 3400 in front of the passenger cabin 1100, instead of simply in front of the rotor mast 2104, the centre of mass of the secondary fuel cell 3400 is shifted further forward. By shifting the secondary fuel cell 3400 centre of mass further forward, the effect of changing the mass of the secondary fuel cell 3400 on the overall centre of mass of the helicopter 100 is greater. In other words, the secondary fuel cell 3400 is more effective at shifting the mass distribution when positioned further forward. Therefore, the amount of fuel required in the secondary fuel cell 3400 to provide the required mass distribution may be reduced, which may result in a reduction in the overall mass of the helicopter 100.

In this particular embodiment, the secondary fuel cell 3400 is positioned in the nose of the helicopter 100, below the level of the front and rear seating positions 1110, 1120, as shown in FIGS. 4*b* and 4*c*.

Referring to Table 1 below, there is provided an empty mass budget for the preferred embodiment using the helicopter 100 systems mass breakdown described in NASA CR152315. Table 1 shows that the engine 3100 and transmission unit 3100 (gearbox) have a significant effect on the overall mass of the helicopter 100. The fuselage 1000 also has a large effect on the overall mass, but the mass of the fuselage 100 is distributed around the helicopter and therefore has a smaller impact on the mass distribution.

TABLE 1

Empty Mass Budget for an example helicopter

| NASA Number | Item | Mass (kg) |
| --- | --- | --- |
| 2A | Blade Assy | 83 |
| 2B | Rotor Hub and Hinge | 50 |
| 3A | Tail Rotor | 5 |
| 3B | Tail Structure | 12 |
| 4 | Fuselage (Inc. windows, doors, bulkhead) | 174 |
| 5 | Rear Retractable undercarriage | 16.7 |
| 5 | Rear Retractable undercarriage | 16.7 |
| 5 | Front Retractable undercarriage | 16.7 |
| 6 | Nacelle (Inc. engine mount, firewall cowel, air inlet) | 15 |
| 7A | Engine | 113 |
| 7B | Drive (Gearbox) | 102 |
| 7C | Fuel System (Inc. tank) | 31 |
| 8 | Flight Controls (swash etc.) | 55 |

TABLE 1-continued

Empty Mass Budget for an example helicopter

| NASA Number | Item | Mass (kg) |
|---|---|---|
| 8 | Flight Controls (Front) | 5 |
| 10 | Instruments | 15 |
| 11 | Hydraulics | 0 |
| 12 | Pneumatic Systems | 0 |
| 13 | Electrical (including Battery, lights ac power) | 51 |
| 14 | Avionics (autopilot, comms, navigation, recorders) | 19 |
| 15 | Furnishings (Trim, carpet (450 gsm), bulkhead and roof liner) | 50 |
| 16 | Air Conditioning | 20 |

Referring to Table 2 and Table 3, there is provided a worst-case aft mass distribution and a worst-case fwd mass distribution.

The worst-case aft mass distribution assumes that there is one pilot with a lighter limit mass of 75 kg. In this embodiment, the secondary fuel cell 3400 centre of mass is positioned 655 mm from the front of the helicopter and 2720 mm in front of the empty helicopter 100 centre of mass. In this situation, the centre of mass is shifted rearwards and therefore the secondary fuel cell 3400 is used to provide 58.5 kg of ballast to shift the centre of mass forwards. With the secondary fuel cell 3400 the centre of mass is limited to a 3244 mm rearward position, instead of 3352 mm, which reduces the centre of mass shift by 108 mm.

TABLE 2

Worst Case Aft Mass Distribution for an exemplary helicopter
Worst Case (Light - Aft CG)

| Item | Mass (kg) | x (mm) | xM (m * d kg · mm) |
|---|---|---|---|
| Empty Helicopter | 850 | 3375 | 2868750 |
| Pilot | 75 | 1850 | 138750 |
| Front Pax | 0 | 1850 | 0 |
| Rear Pax 1 | 0 | 2900 | 0 |
| Rear Pax 2 | 0 | 2900 | 0 |
| Rear Pax 3 | 0 | 2900 | 0 |
| Bags | 0 | 4390 | 0 |
| Forward Ballast Fitted | 58.5 | 655 | 38318 |
| Rear Ballast Fitted | 0 | 9430 | 0 |
| Max Fuel | 471.5 | 3550 | 1673825 |
| No Fuel Total | 984 | | 3045818 |
| Max Fuel Total | 1455 | | 4719643 |

TABLE 3

Worst Case Fwd Mass Distribution for an exemplary helicopter
Worst Case (Nominal - Fwd CG)

| Item | Mass (kg) | x (mm) | xM (m * d kg · mm) |
|---|---|---|---|
| Empty Helicopter | 850 | 3375 | 2868750 |
| Pilot | 95 | 1850 | 175750 |
| Front Pax | 95 | 1850 | 175750 |
| Rear Pax 1 | 95 | 2900 | 275500 |
| Rear Pax 2 | 95 | 2900 | 275500 |
| Rear Pax 3 | 95 | 2900 | 275500 |
| Bags | 0 | 4390 | 0 |
| Forward Ballast Fitted | 0 | 749.5 | 0 |
| Rear Ballast Fitted | 0 | 9430 | 0 |
| Max Fuel | 325 | 3550 | 1153750 |
| No Fuel Total | 1325 | | 4046750 |
| Max Fuel Total | 1650 | | 5200500 |

The worst-case fwd mass distribution assumes that there is one pilot with a heavier limit mass of 95 kg and four passengers distributed as mentioned above with a heavier limit mass of 95 kg. In this embodiment, the secondary fuel cell 3400 centre of mass is positioned 655 mm from the front of the helicopter and 2720 mm in front of the empty helicopter 100 centre of mass. In this situation, the centre of mass is shifted forwards and therefore the secondary fuel cell 3400 is empty. With the secondary fuel cell 3400 empty the centre of mass is limited to a 3151 mm forward position.

In this embodiment, the maximum take-off mass of the helicopter 100 is 1650 kg, of which 850 kg is provided by the empty helicopter 100. Hence, the useful mass fraction, i.e. the fuel and payload mass, is approximately 50% which is known in the art to be high. By having a high useful mass fraction this may enable the helicopter 100 to carry more fuel for mast distribution purposes. However, this a high useful mass fraction may also cause a greater centre of mass shift as more payload may be carried.

In this embodiment, to provide ballast to counteract the payload induced centre of mass shift, the secondary fuel cell 3400 has a capacity between 5% and 20% of the primary fuel cell 3300, and preferably between 10% and 20%. Maximising the size of the secondary fuel cell 3400 may increase the ballast capability, however, if the secondary fuel cell 3400 is made too large then the empty weight of the secondary fuel cell 3400 may significantly add to the empty helicopter 100 mass.

In this embodiment, the primary fuel cell 3300 has a maximum capacity of between 600 litres and 800 litres, preferably 660 litres. In this embodiment, the secondary fuel cell 3400 has a maximum capacity of between 60 litres and 80 litres, preferably 76 litres. This size of fuel cells 3300, 3400 results in a fuel capacity of around 30% of the maximum take off mass. In other words, the fuel may use around 60% of the useful mass.

Figure 4D:
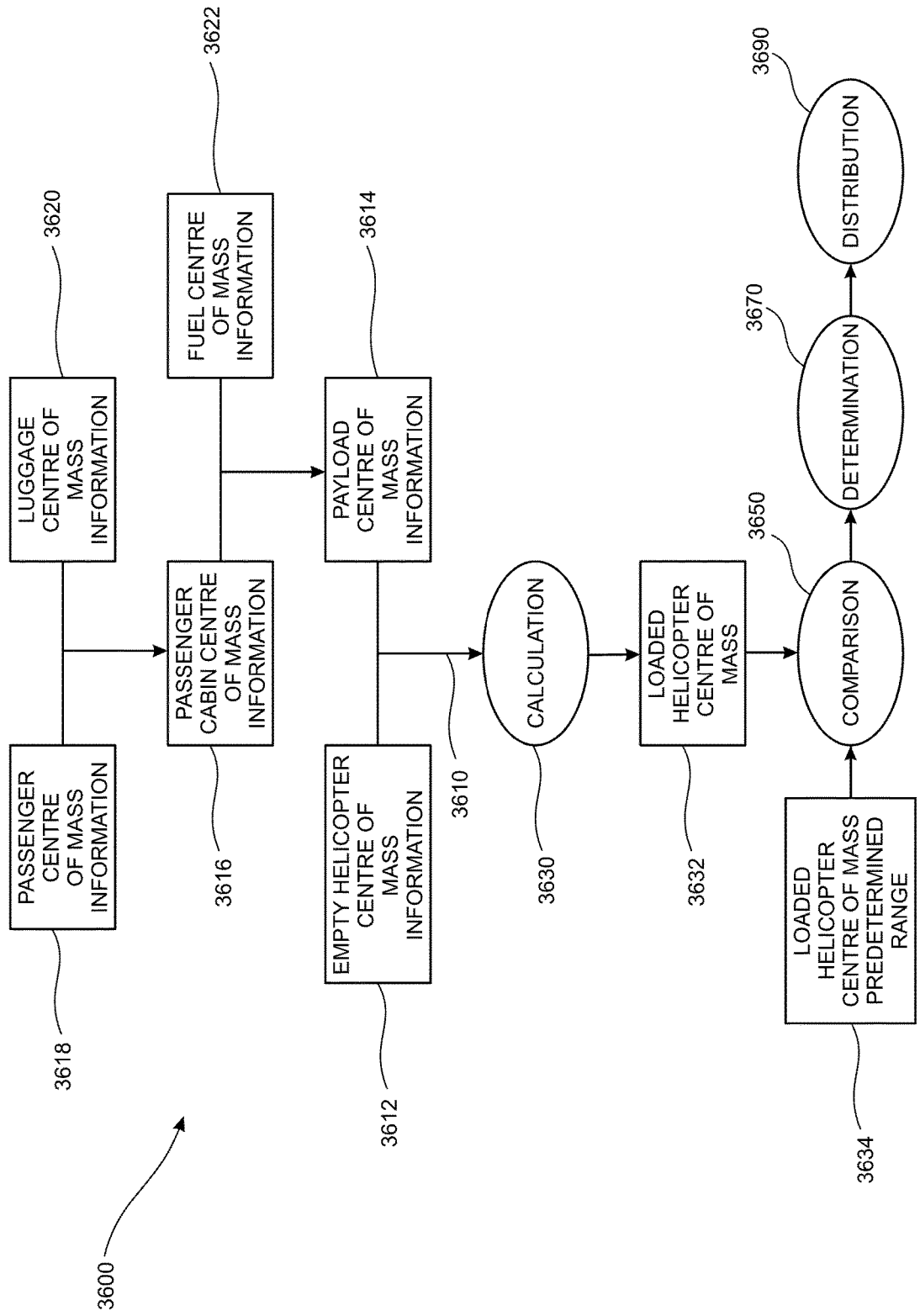

Referring to FIG. 4d, there is provided a longitudinal mass distribution method 3600. The method comprises inputting empty helicopter centre of mass information 3612 and payload centre of mass information 3614, calculating 3630 the loaded helicopter centre of mass 3632, comparing 3650 the loaded helicopter centre of mass 3632 with a predetermined loaded helicopter centre of mass range 3634, determining 3670 if the loaded helicopter centre of mass 3632 is within the predetermined loaded helicopter centre of mass range 3634, distributing 3690 fuel from a primary fuel cell 3300 to a secondary fuel cell 3400, in which the distribution 3690 is dependent on the comparison 3650 between the calculated loaded helicopter centre of mass 3632 and the predetermined loaded helicopter centre of mass range 3634.

It is preferable that the empty helicopter centre of mass information 3612 and the predetermined loaded helicopter centre of mass range 3634 are known for the specific helicopter 100 in use. In this embodiment, the helicopter 100 is the HX50 Hill Helicopter 100.

The predetermined loaded helicopter centre of mass range 3634 is defined as a safety and/or efficiency range that has been calculated by theory or measured by testing. In other words, the range is the normal operating range for the helicopter 100 in use based on the safety and efficiency implications of shifting the mass distribution. Regarding safety, a large centre of mass shift may require significant pilot cyclic input to counteract, which could exceed loading limits on some components or cause an increase in blade 2102 angle of attack which may cause blade 2102 stalling.

Regarding efficiency, the increase in blade 2102 angle of attack may increase the profile drag of the blades 2102 and reduce the efficiency.

By comparing 3650 the loaded helicopter centre of mass 3632 with a predetermined loaded helicopter centre of mass range 3634 this enables the mass distribution computing device 3700, mentioned below, to determine 3670 if the loaded helicopter centre of mass 3632 is within the predetermined loaded helicopter centre of mass range 3634. If the loaded helicopter centre of mass 3632 is not within the predetermined loaded helicopter centre of mass range 3634 then a distribution 3690 is required. However, if the loaded helicopter centre of mass 3632 is within the predetermined loaded helicopter centre of mass range 3634 then there may be no need to distribute 3690 the fuel. Although, it may be suitable to distribute the fuel within the predetermined loaded helicopter centre of mass range 3634 to a more optimal position.

By distributing 3690 fuel from a primary fuel cell 3300 to a secondary fuel cell 3400 this enables the loaded helicopter centre of mass 3632 to be shifted towards the predetermined loaded helicopter centre of mass range 3634.

In this embodiment, the amount of fuel distributed 3690 from the primary fuel cell 3300 to the secondary fuel cell 3400 is dependent on the variation between the loaded helicopter centre of mass 3632 and the predetermined loaded helicopter centre of mass range 3634. In other words, the further the loaded helicopter centre of mass 3632 is from the predetermined loaded helicopter centre of mass range 3634 then the more fuel is distributed 3690 to get closer to the predetermined loaded helicopter centre of mass range 3634.

In this embodiment, the amount of fuel distributed 3690 from the primary fuel cell 3300 to the secondary fuel cell 3400 is sufficient to shift the loaded helicopter centre of mass 3632 into the predetermined loaded helicopter centre of mass range 3634. In other words, the distribution 3690 of fuel aims to return the helicopter centre of mass 3632 to the predetermined loaded helicopter centre of mass range 3634.

It is preferable that any centre of mass information comprises mass and longitudinal position. By knowing the mass and the longitudinal position of each component, the individual contribution to the mass distribution may be accounted for in the loaded helicopter centre of mass 3632.

It is preferable that the payload centre of mass information 3614 further comprises loaded passenger cabin centre of mass information 3616 and fuel centre of mass information 3622. By knowing the fuel centre of mass information 3622 the individual contribution of the fuel, which varies during flight, may be accounted for loaded helicopter centre of mass 3632.

It is preferable that the loaded passenger cabin centre of mass information 3616 comprises at least one passenger centre of mass information 3618 and luggage centre of mass information 3620. By knowing each/the passenger centre of mass information 3618 the individual contribution of the passenger, which may be varied between flights, may be accounted for loaded helicopter centre of mass 3632.

The longitudinal mass distribution method 3600 may be carried out before flight or during flight. If the method is carried out before flight, then it may be carried out manually by calculating the take-off loaded helicopter centre of mass 3632 and manually distributing 3690 the fuel between the primary fuel cell 3300 and the secondary fuel cell 3400. If the method is carried out during flight, then it may be carried out by a mass distribution computing device 3700, as mentioned below. The mass distribution computing device 3700 may also be used before flight.

Figure 4E:
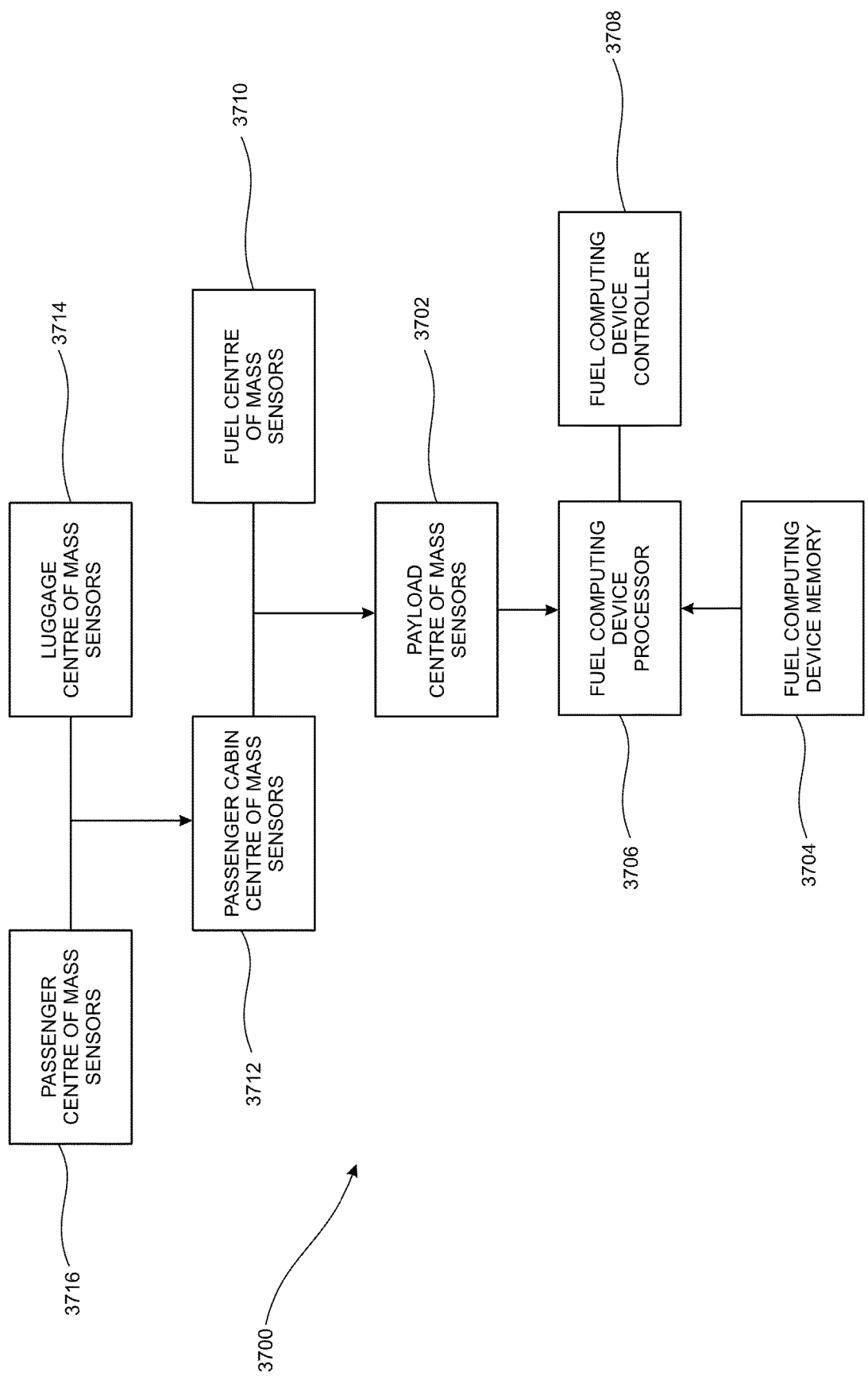

Referring to FIG. 4e, it is preferable that the longitudinal mass distribution method 3600 is carried out on a mass distribution computing device 3700, before and during flight.

It is also preferable that the known empty helicopter centre of mass information 3612 and the predetermined loaded helicopter centre of mass range 3634 are stored by a mass distribution computing device memory 3704. It is also preferable that the payload centre of mass information 3614 is either inputted 3610 manually by the pilot or it is provided by payload centre of mass sensors 3702 on the helicopter 100. It may only be possible to input 3610 the payload centre of mass information 3614 manually before take-off. Inputting 3610 the payload centre of mass information 3614 automatically from the payload centre of mass sensors 3702 may be carried out before take-off or during flight.

In this embodiment, the payload centre of mass sensors 3702 further comprise fuel centre of mass sensors 3710 and passenger cabin centre of mass sensors 3712. The fuel centre of mass sensors 3710 are positioned in both the first fuel cell 3300 and the second fuel cell 3400. The fuel centre of mass sensors 3710 can enable to fuel level to be tracked during flight. In this embodiment, the passenger cabin centre of mass sensors 3712 further comprises luggage centre of mass sensors 3714 and passenger centre of mass sensors 3716. The luggage centre of mass sensors 3714 are positioned in the luggage hold. The passenger centre of mass sensors 3716 are positioned in both the front seating position 1110 and the second seating position 1120.

It is also preferable that the calculation 3630 of the loaded helicopter centre of mass 3632 is carried out by a mass distribution computing device processor 3706.

It is also preferable that the comparison 3650 of the loaded helicopter centre of mass 3634 with a predetermined loaded helicopter centre of mass range 3632 is carried out by the mass distribution computing device processor 3706.

It is also preferable that the determination 3670 of whether the loaded helicopter centre of mass 3632 is within the predetermined loaded helicopter centre of mass range 3634 is carried out by the mass distribution computing device processor 3706.

It is also preferable that the distribution 3650 of fuel is regulated by a mass distribution controller 3708 and carried out by a fuel pump 3510 on the helicopter 100 before take-off and during flight. However, it is also possible for the distribution 3650 of fuel to be carried out manually before take-off.

In a preferred embodiment, the primary and secondary fuel cells are linked by at least one fuel line and at least one pressure valve and diaphragm system. The pressure valve causes fuel to be consumed out of each fuel cell in proportion to their volume so that the relative amount of fuel in each cell remains substantially constant. When the fuel cells are filled, the pressure equalisation valve ensures that both fuel cells are filled to the correct levels. A mechanical pressure sensing system can be used to set the relative pressure between the two fuel cells. Moreover, an active control, such as an active override system, can enable the fuel levels to be set and maintained in each fuel cell individually.

In a particular embodiment, the primary fuel cell and the secondary fuel cell are each connected to the engine (or power plant) via a fuel line such that the engine can take fuel directly from either cell. In one embodiment, each cell is connected to the engine via an input port of a valve, the valve having two input ports and a single output port to the engine. A controller controls the valve to switch between the input ports, thereby allowing the engine to draw fuel from either the first fuel cell or the second fuel cell. A simple pumping arrangement, such as a fixed displacement pump or other low pressure pump may be provided to actively pump fuel to the engine. Moreover, separate pumps may be provided for each fuel cell.

Sensors provide inputs to the valve controller to enable the controller to determine whether to supply fuel to the engine from the first or second fuel cell. In particular, the controller may use sensor information that relates to the height of fuel within the first and/or second cells to determine the cell from which to draw fuel.

If the fuel cells were cuboid, or at least regular in shape, then it would be straightforward for a controller to convert the height of the fluid level within the cell to the remaining fuel volume and thereby to determine the relatively volume of fluid in each cell and how that changes over a particular flight. However, the fuel cells of a helicopter are required to maximise the available space while fitting around other components in the helicopter body. This means that the shapes of the fuel cells are not regular and a simple conversion from the height of the fluid in the cell to the volume of remaining fuel is not possible.

In a particular embodiment, therefore, the controller is preconfigured with a map or lookup table specifying the fuel volume remaining in a fuel cell for a particular height of fluid in that cell. This information is necessary to determine the remaining mass of fluid in each cell and therefore to ensure that the overall fuel load remains balanced along the longitudinal axis of the helicopter. The map or lookup table enables the controller to determine the volume, and therefore, mass of fluid remaining in each fuel cell and therefore to determine when to switch from drawing fuel from the primary cell to drawing fluid from the secondary cell.

It is noted that the controller may switch between drawing fluid from the primary and secondary cells several times during a particular flight in order to keep the helicopter balanced and to keep the centre of mass of the combined fuel cells under the rotor mast.

The system may also be fitted with a manual over-ride to enable the pilot to specify the fuel cell from which fuel should be drawn and a safety over-ride to enable fuel to be taken from an available fuel cell if the other fuel cell becomes empty or unavailable.

In some embodiments, the valve may allow some fuel to flow to the engine from each of the first and second fuel cells. That is, the valve may allow the engine to take 20% of its fuel from the secondary fuel cell and 80% of its fuel from the primary fuel cell. This can allow the fuel cells to remain at fixed relative fuel levels once the centre of mass has been fixed. However, for most implementations, this arrangement is likely to be considered unnecessarily complex and may require two fuel pumps to running throughout the flight.

Figure 4F:
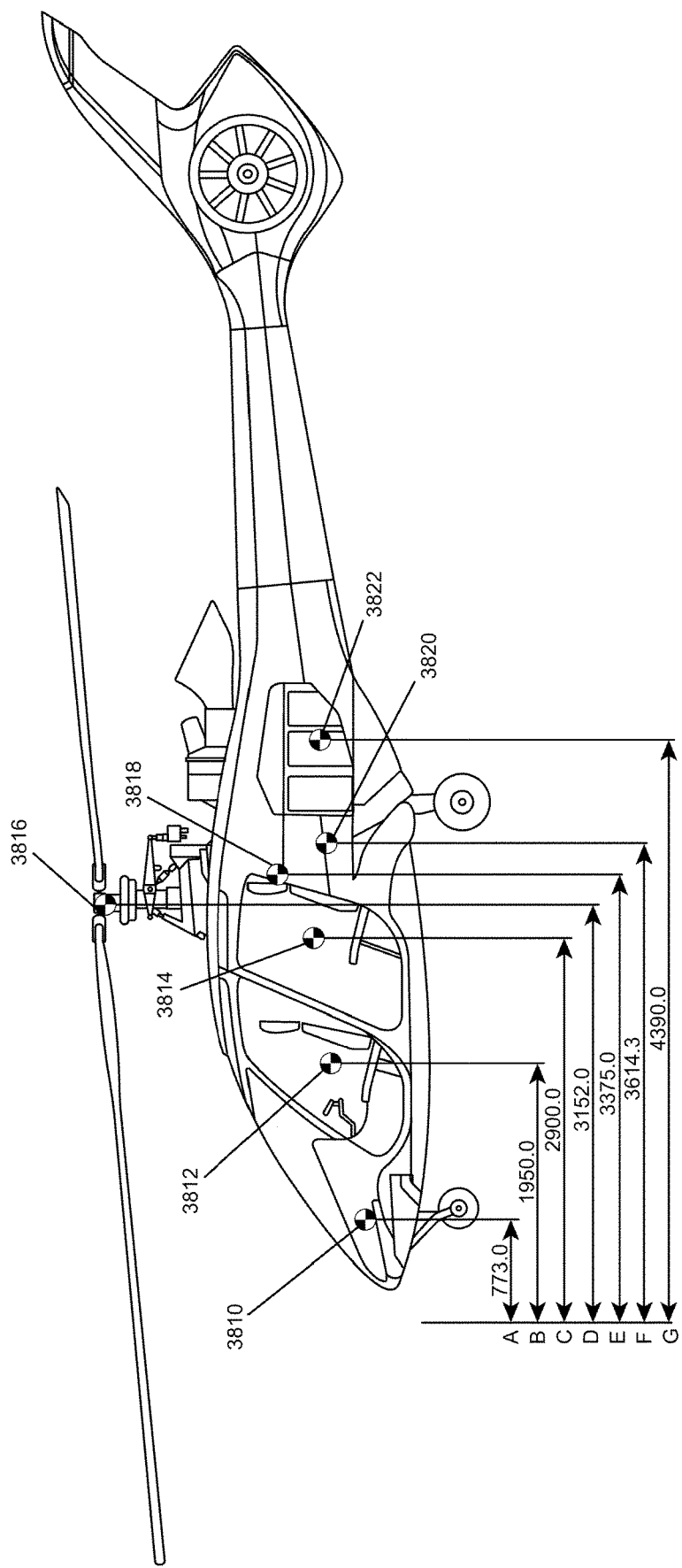
FIG. 4f shows a side view of a helicopter with a mass distribution apparatus according to one embodiment.

A particular embodiment of the centre of mass distribution system is illustrated in FIG. 4f. Marked on the figure are a number of reference points and the distance along the longitudinal axis of the helicopter from the nose to each of the reference points is set out in the table below. It will be appreciated that these distances are exemplary only and the systems described herein may be applied to helicopters or other aircraft of varying sizes, profiles and shapes. Moreover, not all of the elements shown here may be provided in every helicopter.

TABLE 4

| Reference numeral | Helicopter reference point | Distance from nose to reference point (mm) |
|---|---|---|
| 3810 | Centre of mass of secondary fuel cell | 773 |
| 3812 | Centre of mass of forward seating area (including pilot seating area) | 1950 |
| 3814 | Centre of mass of rear seating area (passenger seating area) | 2900 |
| 3816 | Centre of mass of rotor hub or rotor hub location | 3152 |
| 3818 | Centre of mass of empty helicopter | 3375 |
| 3820 | Centre of mass of primary fuel cell | 3614 |
| 3822 | Centre of mass of baggage store | 4390 |

TABLE 5

Load cases for the example helicopter of FIG. 4f

| | | Loadcases | | | | | |
|---|---|---|---|---|---|---|---|
| Item | CofG Posn x (mm) | Solo Pilot Mass (kg) | Heavy - Fore CG Mass (kg) | Big Payload - Aft CG Mass (kg) | Size 0 - Pilot Mass (kg) | Max Payload Mass (kg) | 2 up Mass (kg) |
| Empty Helicopter | 3375 | 850 | 850 | 850 | 850 | 850 | 850 |
| Pilot | 1950 | 70 | 95 | 85 | 40 | 95 | 95 |
| Front Passenger | 1950 | 0 | 95 | 85 | 0 | 0 | 95 |
| Rear Passenger 1 | 2900 | 0 | 95 | 0 | 0 | 0 | 0 |
| Rear Passenger 2 | 2900 | 0 | 95 | 0 | 0 | 250 | 0 |
| Rear Passenger 3 | 2900 | 0 | 95 | 0 | 0 | 0 | 0 |
| Bags | 4390 | 0 | 0 | 115 | 0 | 0 | 0 |
| Forward Ballast Fitted | 655 | 0 | 0 | 0 | 15 | 0 | 0 |
| Rear Ballast Fitted | 9430 | 0 | 0 | 0 | 0 | 0 | 0 |
| Max Fuel | 3168 | 550 | 325 | 515 | 550 | 455 | 550 |
| Total Mass | | 1470 | 1650 | 1650 | 1455 | 1650 | 1590 |
| Mast Position | 3167.5 | | | | | | |
| Deviation from Mast Position | Full Tank | 62 | −79 | 67 | 62 | −4 | −34 |
| | Empty Tank | 99 | −99 | 97 | 99 | −5 | −53 |

Table 5 above shows the centre of mass position for various reference points in the helicopter of FIG. 4f under various loading conditions, for example with a single pilot, with maximum cabin occupancy or with a heavy baggage loading.

It can be seen in Table 5 that, although the total mass of the helicopter varies significantly, the position of the centre of mass of the helicopter from the mast position does not vary by more than 100 mm along the longitudinal axis in either direction, even as the fuel loading changes from full fuel tanks to empty fuel tanks. Where the position of the centre of mass of a fuel cell varies significantly from full to empty, a representative position corresponding to the half full condition may be used.

Figure 5B:
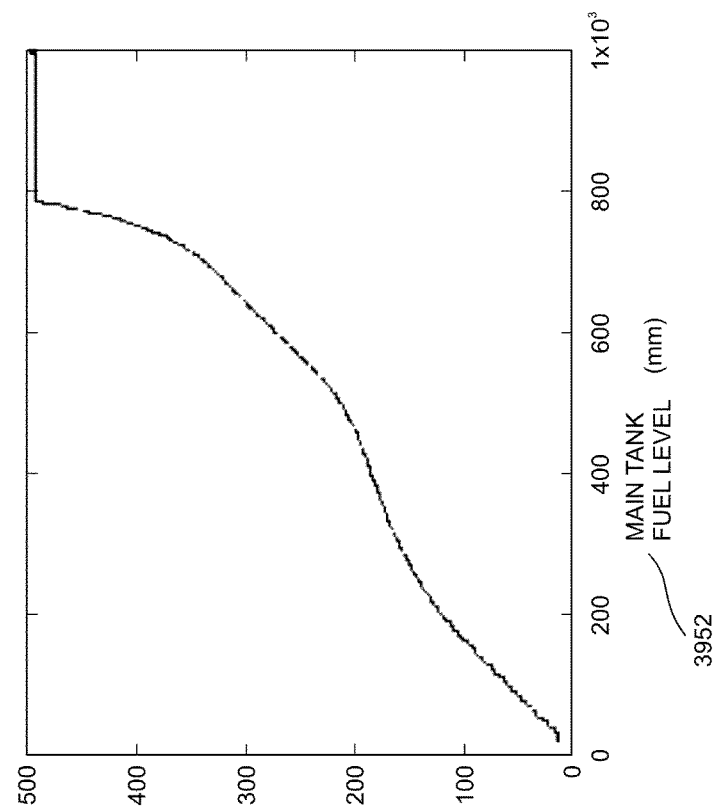
FIG. 5b illustrates relative fuel levels between a main fuel tank and a trim tank.
Figure 5A:
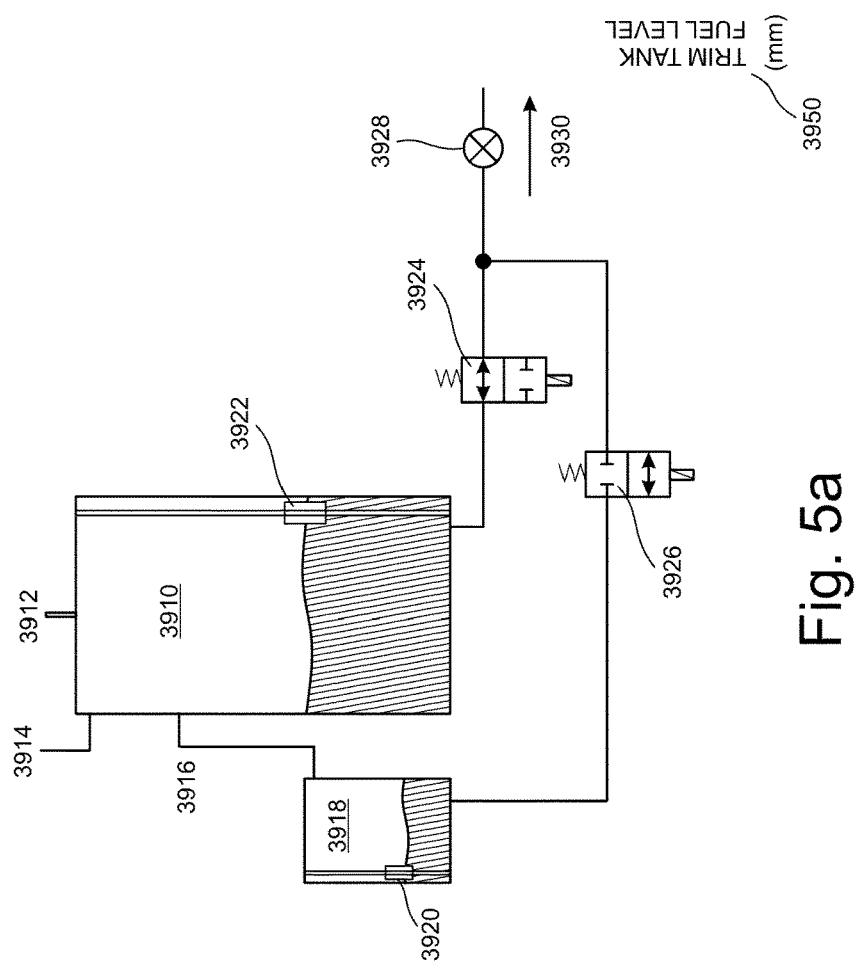
FIG. 5a is a schematic illustration of a fuel distribution system according to one embodiment.

A particular embodiment is illustrated in FIGS. 5a and 5b. In this embodiment, a normally-open valve 3924 connects the main tank 3910 to the fuel pump 3928 via a 2-inlet, 1-outlet manifold or valve so that fuel can be output 3930 to the engine (not shown). A normally-closed valve 3926 connects the trimmer tank 3918 to the same manifold. The use of a normally-open valve 3924 to connect the main tank 3910 to the fuel pump 3928 provides a fail-safe mechanism such that, by default, fuel is drawn from the main tank to the engine.

Level sensors are provided in the main tank 3922 and in the trim tank 3920 to determine the level of fuel in each tank. Moreover, the main tank is provided with a fuel filling inlet 3912 and a tank vent 3914 and a fuel line 3916 links the main tank 3910 to the trim or secondary tank 3918 so that the trim tank automatically begins to fill from the main tank when the fuel fill in the main tank reaches a particular level.

The map or graph of FIG. 5b is an illustration of the relative fill of the main tank 3952 to trim tank 3950 fuel level. In the present embodiment, it is noted that the trim tank fuel level can lie in the range 0 to 500 mm and the main tank fuel level can lie in the range 0 to 1000 mm, however the skilled person will appreciate that the fill level depends on the shape of a particular tank and the actual values and relative values between the two tanks will vary depending on the tank shapes and sizes.

In a preferred embodiment, an electronic control system constantly monitors the fuel level in both tanks and maintains the fuel tank level ratios in accordance with this map. Alternatively a curve fitted function may be used for the same purpose rather than a discrete map. As can be seen from the map, the trim tank is required to be full at main tank fill levels above 800 mm. Therefore, the filling of the trim tank will be primarily through the trim tank fill/level hose, and for partial fills of the main tank the trim tank will be filled by gravity by opening both control valves.

Using this method, the virtual tank position (CoM of the combined fuel tank system) can be maintained at a constant position directly under the mast for fuel fills up to 520 litres or (77% total fuel capacity). At increased fuel fills the CofM of the virtual tank moves rearward by 100 mm. As the maximum gross take off weight of the helicopter governs the fuel fill capacity, then we have the favourable scenario where for the heaviest loaded helicopter where the passenger payload is a large load variation then this limits the fuel carrying capacity to a level (60% in the 5×95 kg case) where the virtual tank CofM is constant, conversely when partly loaded and the helicopter passenger payload is less variable, then a slight increase in fuel tank variation is tolerable.

In summary, centre of mass management in a helicopter such as those described herein can include one or more of:
Placing rear seat passengers under the rotor mast for minimal impact on CG as load varies
Placing primary fuel cell behind main cabin bulkhead
Engineering primary fuel cell tank volume to have the smallest possible longitudinal extent (i.e. tall wide tank)
Setting the front seat pilot station based on rear passenger leg room requirements.
Placing baggage compartment directly aft of fuel tank.
Providing baggage provisions in rear cabin for solo pilot operations.
Providing a nose trimmer fuel tank, linked by a pressure balancing valve to artificially bring the CG of the fuel forwards to directly under the mast at all fuel levels.

Therefore, under all practical loading conditions the longitudinal centre of mass position can be maintained with +/− 10 cm of the mast station and well within the normal range for light helicopters, despite the high payload, large cabin and high useful mass fraction.

The invention claimed is:

1. A helicopter having a longitudinal axis, a lateral axis and a vertical axis, a helicopter centre of mass and a maximum gross mass of less than 5000 kg, the helicopter comprising;
a fuselage elongate along the longitudinal axis, the fuselage comprising an aerodynamically shaped shell defining a front, a rear, a top and a bottom of the fuselage and a passenger cabin therein having two forward-facing front seating positions for the pilot and a co-pilot or a passenger, and forward-facing rear seating positions for at least 2 passengers, optionally 3 passengers;
a primary fuel cell mounted substantially behind the passenger cabin;
a tail boom assembly extending from a tail boom bulkhead at the rear of the fuselage and including a tail rotor;
a main rotor assembly comprising a hub, at least two main rotor blades mounted by a rotor mast to the top of the fuselage to permit the main rotor blades to rotate with respect to the fuselage;
the front seating position for the pilot having a centre of mass at a first location substantially in front of the rotor hub location, and the primary fuel cell having a centre of mass at a second location substantially behind the rotor hub location;
a landing gear arrangement;
a power plant mounted substantially above and behind the passenger cabin, wherein the primary fuel cell is arranged to provide fuel to the power plant; and
a secondary fuel cell having a centre of mass at a nose location in front of the rotor hub location by at least 1500 mm.

2. The helicopter according to claim 1 wherein the secondary fuel cell is maintained to a fill level to keep the helicopter centre of mass within 150 mm, preferably within 100 mm of a position directly below the rotor hub location.

3. The helicopter according to claim 1 wherein the forward-facing rear seating positions have a centre of mass arranged substantially below the rotor mast.

4. The helicopter according to claim 1 wherein the primary fuel cell has a greater length along the lateral axis than along the longitudinal axis.

5. The helicopter according to claim 1 wherein the primary fuel cell has a greater height along the vertical axis than length along the longitudinal axis.

6. The helicopter according to claim 1 further comprising a baggage compartment directly aft of the primary fuel cell along the longitudinal axis.

7. The helicopter according to claim 1 wherein the secondary fuel cell is arranged to provide fuel directly to the power plant.

8. The helicopter according to claim 1 wherein the secondary fuel cell is arranged to transfer fuel to and from the primary fuel cell via a fuel supply line.

9. The helicopter according to claim 1 further comprising a pressure balancing valve arranged between the primary fuel call and the secondary fuel cell.

10. The helicopter according to claim 1 wherein the secondary fuel cell is positioned entirely in front of the first location.

11. The helicopter according to claim 1 wherein the helicopter has a maximum gross mass of less than 2000 kg and an empty mass of less than 1000 kg.

12. The helicopter according to claim 1 wherein the helicopter has an occupant capacity of at least 4 occupants and at most 6 occupants.

13. The helicopter according to claim 1 wherein the primary fuel cell has a fuel capacity of at least 400 litres, preferably 600 litres or more.

14. The helicopter according to claim 1 wherein the secondary fuel cell has a fuel capacity of at least 50 litres, preferably 70 litres or more.

15. The helicopter according to claim 1 wherein the secondary fuel cell has a fuel capacity of less than 20% of the primary fuel cell, preferably around 15% or around 10% of the primary fuel cell.

16. The helicopter according to claim 1 further comprising a fuel pump for transferring fuel between the primary fuel cell and the secondary fuel cell, further optionally the fuel pump is operable to transfer fuel between the primary fuel cell and the secondary fuel cell during flight.

17. The helicopter according to claim 1 further comprising a mass distribution controller for receiving information relating to the loading of the helicopter and controlling the fuel pump to transfer fuel between the primary fuel cell and the secondary fuel cell to adjust the centre of mass of the helicopter, optionally wherein the information relating to the loading of the helicopter includes passenger cabin centre of mass information and fuel centre of mass information.

18. The helicopter according to claim 1 wherein the rotor mast has a length of less than 1500 mm, preferably less than 1000 mm.

* * * * *